(12) United States Patent
Detrembleur et al.

(10) Patent No.: US 10,843,224 B2
(45) Date of Patent: Nov. 24, 2020

(54) PLASMA DEPOSITION METHOD FOR CATECHOL/QUINONE FUNCTIONALISED LAYERS

(71) Applicant: Luxembourg Institute of Science and Technology (LIST), Esch sur Alzette (LU)

(72) Inventors: Christophe Detrembleur, Liege (BE); Cecile Vandeweerdt, Liege (BE); Christelle Vreuls, Liege (BE); Rodolphe Mauchauffe, Russange (FR); Maryline Moreno-Couranjou, Russange (FR); Nicolas Boscher, Audun le Tiche (FR); Patrick Choquet, Longeville le Metz (FR)

(73) Assignee: LUXEMBOURG INSTITUTE OF SCIENCE AND TECHNOLOGY (LIST), Esch/Alzette (LU)

(*) Notice: Subject to any disclaimer, the term of this patent is extended or adjusted under 35 U.S.C. 154(b) by 321 days.

(21) Appl. No.: 15/515,916

(22) PCT Filed: Aug. 24, 2015

(86) PCT No.: PCT/EP2015/069361
§ 371 (c)(1),
(2) Date: Mar. 30, 2017

(87) PCT Pub. No.: WO2016/050419
PCT Pub. Date: Apr. 7, 2016

(65) Prior Publication Data
US 2017/0297055 A1 Oct. 19, 2017

(30) Foreign Application Priority Data
Sep. 30, 2014 (EP) .................................... 14187218

(51) Int. Cl.
*C09D 133/04* (2006.01)
*B05D 1/00* (2006.01)
(Continued)

(52) U.S. Cl.
CPC ................. *B05D 1/62* (2013.01); *B05D 5/00* (2013.01); *C09D 133/04* (2013.01); *C09D 133/26* (2013.01)

(58) Field of Classification Search
CPC ... B05D 1/00; B05D 1/62; B05D 5/00; C09D 133/04; C09D 133/26
See application file for complete search history.

(56) References Cited

U.S. PATENT DOCUMENTS

| | | | |
|---|---|---|---|
| 4,693,799 A | 9/1987 | Yanagihara et al. | |
| 4,952,656 A * | 8/1990 | Lai .......................... | C08F 8/12 525/328.2 |

(Continued)

FOREIGN PATENT DOCUMENTS

| EP | 0318956 A2 | 6/1989 |
|---|---|---|
| EP | 2130844 A1 | 12/2009 |

(Continued)

OTHER PUBLICATIONS

Ball, Vincent, et al., "Deposition Mechanism and Properties of Thin Polydopamine Films for High Added Value Applications in Surface Science at the Nanoscale." BioNanoScience 2.1 (2012) 2:16-34.*

(Continued)

*Primary Examiner* — Bret P Chen
(74) *Attorney, Agent, or Firm* — Sandberg Phoenix & von Gontard, P.C.

(57) ABSTRACT

A solvent-free plasma method for depositing an adherent catechol and/or quinone functionalised layer to an inorganic or organic substrate from a precursor which comprises at least a quinone group; a protected or unprotected catechol (Continued)

group; a molecule substituted by a quinone group and/or a protected or unprotected catechol group; and/or a natural or synthetic derivative of a catechol group and/or a quinone group; wherein the quinone group is a 1,2-benzoquinone group and the catechol group is a 1,-dihydroxybenzene group.

9 Claims, 7 Drawing Sheets

(51) Int. Cl.
*B05D 5/00* (2006.01)
*C09D 133/26* (2006.01)

(56) References Cited

U.S. PATENT DOCUMENTS

| | | | | |
|---|---|---|---|---|
| 6,221,238 | B1* | 4/2001 | Grundig | C12Q 1/004 204/403.1 |
| 2002/0120333 | A1* | 8/2002 | Keogh | A61L 27/34 623/11.11 |
| 2003/0155332 | A1* | 8/2003 | Datta | A61L 2/14 219/151.52 |
| 2006/0208388 | A1* | 9/2006 | Bredt | B33Y 70/00 264/123 |
| 2007/0202612 | A1* | 8/2007 | Winter-Jensen | B05D 1/62 428/336 |
| 2008/0085974 | A1* | 4/2008 | Sortwell | C08F 2/01 524/804 |
| 2008/0149566 | A1* | 6/2008 | Messersmith | C09D 5/1681 210/702 |
| 2008/0300204 | A1* | 12/2008 | Federoff | A61P 35/00 514/44 R |
| 2009/0123652 | A1 | 5/2009 | Messersmith et al. | |
| 2011/0052788 | A1 | 3/2011 | Messersmith et al. | |
| 2012/0111791 | A1 | 5/2012 | Freeman et al. | |
| 2012/0160708 | A1* | 6/2012 | Kohli | G01N 27/127 205/777.5 |
| 2012/0329882 | A1* | 12/2012 | Messersmith | A61L 27/18 514/772.1 |
| 2013/0022752 | A1* | 1/2013 | Antonakas | C23C 16/0245 427/444 |
| 2014/0287565 | A1* | 9/2014 | Yin | H01L 29/66545 438/308 |
| 2015/0005457 | A1* | 1/2015 | Ding | C09D 183/08 525/461 |
| 2018/0118978 | A1* | 5/2018 | Yabu | A61L 26/008 |

FOREIGN PATENT DOCUMENTS

| | | |
|---|---|---|
| KR | 20150094532 A | 8/2015 |
| WO | 02060505 A2 | 8/2002 |
| WO | 2007022645 A1 | 3/2007 |
| WO | 2008019352 A1 | 2/2008 |

OTHER PUBLICATIONS

DuVall, Stacy H., et al., "Self-catalysis by Catechols and Quinones during Heterogeneous Electron Transfer at Carbon Electrodes". J. Am. Chem. Soc. 2000, 122, 6759-6764.*
Wei, Qiang, et al., "Oxidant-induced dopamine polymerization for multifunctional coatings". Polymer Chemistry, 2010, 1, 1430-1433.*
Lee, Haeshin, et al., "Mussel-Inspired Surface Chemistry for Multifunctional Coatings". Science. Oct. 19, 2007; 318(5849): 426-430.*
Cavalieri, Ercole, et al., "Catechol Quinones of Estrogens in the Initiation of Breast, Prostate, and Other Human Cancers". Ann. N.Y. Acad. Sci. 1089: 286-301 (2006).*
Suarez-Garcia, Salvio, et al., "Copolymerization of a Catechol and a Diamine as a Versatile Polydopamine-Like Platform for Surface Functionalization: The Case of a Hydrophobic Coating". Biomimetics 2017, 2, 22, pp. 1-17.*
Cavalieri, Ercole, et al., "Cactechol ortho-quinones: the electrophilic compounds that form depurinating DNA adducts and could initiate cancer and other diseases". Carcinogenesis, vol. 23, No. 6, pp. 1071-1077, 2002.*
Wagriech, Harry, et al., "On the Oxidation Product of Catechol when Oxidized by means of Tyrosinase". J. Biol. Chem. 1936, 115: 459-465.*
Moreno-Couranjou, Maryline, et al., "Anti-biofouling and antibacterial surfaces via a multicomponent coating deposited from an up-scalable atmospheric-pressure plasma-assisted CVD process". J. Mater. Chem. B, 2018, 6, 614-623.*
International Search Report from corresponding International Application No. PCT/EP2015/069361, dated Apr. 18, 2016.

* cited by examiner

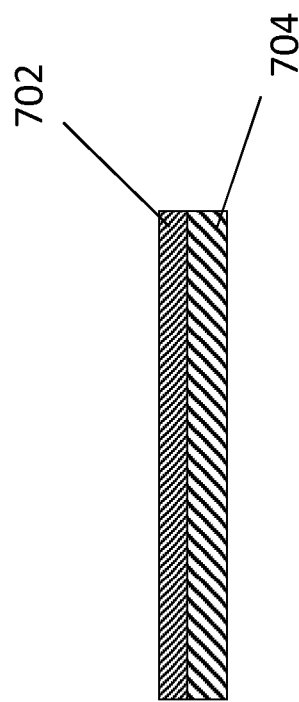
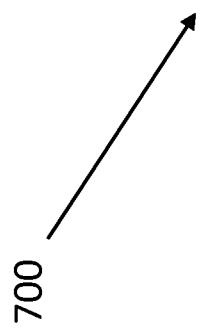
FIGURE 7
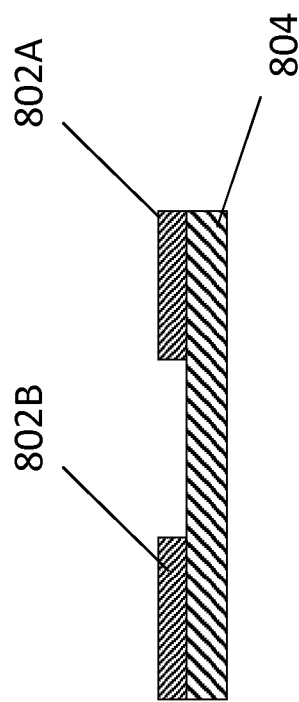
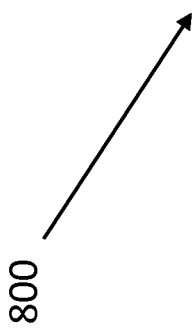
FIGURE 8

PLASMA DEPOSITION METHOD FOR CATECHOL/QUINONE FUNCTIONALISED LAYERS

CROSS-REFERENCE TO RELATED APPLICATIONS

The present invention is the US national stage under 35 U.S.C. § 371 of International Application No. PCT/EP2015/069361, which was filed on Aug. 24, 2015, and which claims the priority of application EP 14187218.4 filed on Sep. 30, 2014, the content of which (text, drawings and claims) are incorporated here by reference in its entirety.

BACKGROUND

Catechol-containing coatings have attracted a lot of attention since the discovery of the role of such groups in the adhesion of mussels. Catechol groups present in the 3,4-dihydroxyphenylalanine (DOPA) found in the Mytilus edulis foot protein or its dihydroxyphenyl derivates (DHPD), are well known to react and adhere to both inorganic and organic surfaces in a wet, turbulent and saline environment. Currently the exact mechanism of such remarkable behaviour is still not fully understood. It was shown that due to the ability of catechol to be oxidized to quinone or to form coordination bonds with metallic atoms, covalent and strong non-covalent bonds could occur between these groups and other compounds. Such properties have led to a growing interest for research in this field, explaining that various techniques were developed to produce such catechol/quinone-containing thin films.

Catechol/quinone functionalised layers are attracting more and more interest from materials scientists and companies due to the richness of the chemistry associated to these highly reactive functional groups.

Different strategies are known to obtain catechol/quinone containing coatings. Typically, wet chemistry is the normal way to form a catechol based layer. The main routes are described in Faure et al. (E. Faure, C. Falentin-Daudré, C. Jérôme, J. Lyskawa, D. Fournier, P. Woisel, C. Detrembleur. Prog. Pol. Sci. 2013, 38, 236-270). There are two main ways to incorporate catechol groups in a coating. The first is based on the deposition of molecules substituted with catechol onto the substrate from an aqueous or organic solution. Molecules can be small organic molecules or macromolecules. Macromolecules are synthetic or natural polymers, and bear at least one catechol group at the chain-end or along the chain as side chains. They are produced by different synthetic pathways that are summarized in the review by Faure et al. The deposition is carried out by the conventional wet deposition techniques such as dip-coating, spraying, roll-coating, etc. The second technique consists in the auto-polymerization of dopamine in alkaline solution during 24 h, or with use of oxidant, such as sodium periodate or an enzyme. U.S. Pat. No. 4,693,799 discloses a process for producing a plasma polymerised film having a low coefficient of friction, using a low temperature plasma. WO2007/022645 discloses a solvent based method to form an adlayer on a substrate which comprises dissolving the compounds to be adhered in water and placing the substrate in the solution for an hour at room temperature.

Current strategies for the deposition of catechol/quinone functionalised layers are based on wet chemical techniques which generally require the use of solvents and are known to present low film deposition rates and are time-consuming. A way of ameliorating these problems has been sought.

SUMMARY

According to the invention there is provided a method for adhering a catechol and/or quinone functionalised layer to a substrate wherein the method comprises the steps of: (a) providing a substrate, (b) providing a precursor which comprises at least a quinone group; a protected or unprotected catechol group; a vinylic or non-vinylic molecule substituted by one or more quinone group and/or protected or unprotected catechol group; and/or a natural or synthetic derivative of a catechol group and/or a quinone group; wherein the quinone group is a 1,2-benzoquinone group and the catechol group is a 1,2-dihydroxybenzene group; (c) applying a plasma to the precursor and the substrate in order to form a coating comprising a catechol and/or quinone functionalised layer on the substrate.

According to the invention there is also provided a substantially solvent-free coated substrate wherein the coating comprises a catechol and/or quinone functionalized layer.

The present invention provides a chemical vapour deposition method assisted by plasma to obtain an adherent catechol/quinone functionalized layer. The catechol/quinone surface content, crosslinking and thickness of the layer as well as the synthesized organic layer molecular weight can be adjusted according to the plasma parameters.

The highly chemically reactive coatings formed by the method of the invention are useful for various applications, due to:

a. Their ability to promote adhesion between two dissimilar surfaces: e.g. ability to bind to or adhere to a dissimilar substrate, surface, compound or particle, both organic (such as proteins, enzymes, polymers (synthetic or natural) and inorganic (metal (oxide) (nano)particles, glass, silica, etc.), in an aqueous, humid, or non-aqueous environment;

b. their ability to form irreversible (covalent bond) or reversible (hydrogen bond, electron π-π interaction) chemical crosslinks either with other catechol/quinone groups or other functional groups (e.g. amine, thiol, imidazoles, hydroxyl, or carboxyl groups), or other reactive groups.

c. their ability to coordinate effectively anionic and cationic species, but especially transition metals such as $Fe^{III}$ in therapeutic, analytical and environmental applications;

d. their reversible redox activity, which together with their strong ability to couple to other molecules and metals, for their use as stimulus-controlled switches for device applications.

Examples of suitable applications for the coated substrate according to the invention include (a) an adhesive coating, (b) an antifouling coating and (c) a coating bearing a biomolecule. For application (a), a suitable substrate for an adhesive coating in some embodiments may be a tape, a bandage, a patch, a wound dressing and/or a medical device (such as an electrode). For application (b), a suitable substrate for an antifouling coating in some embodiments may be a medical device, a contact and/or intraocular lens, a blood-contacting device, a medical implant, a surgical tool, a tissue scaffold implant.

Compared to traditional wet techniques, a plasma deposition method presents several advantages:

a. it is a simple one-step procedure and is an all-dry solvent-free process;
b. it is considered as a green process as it uses a minimal amount of substances, produces of minimal amount of effluent, no environmental remediation process required and is viable in industrial applications;
c. it is considered as a non-substrate specific surface treatment method,
d. the modification is limited to the top surface layer and does not affect the material bulk properties;
e. in general, the modification is fairly uniform over the whole substrate;
f. the chemistry of the deposited layer, notably the density of the functional groups which are useful for controlling molecule bonding, can be finely tuned by adjusting the process parameters;
g. coatings presenting a broad range of common functional groups, such as anhydride, carboxylic acid, amines, epoxy, hydroxyl or bromine, can be deposited by using a suitable organic precursor.
h. the deposited layer is free from impurities related to the solvents or plasticiser agents used in wet chemistry.

Concerning advantage (a), it would be understood by a person of skill in the art that a plasma deposition method is not a wet chemistry process such as dipping or spraying which require a liquid solvent in addition to polymerizing monomers. In contrast, a plasma deposition method is an all-dry, solvent-free process because the reaction takes place in a gaseous phase with no addition of a liquid organic solvent.

Compared to low pressure Chemical Vapor Deposition technique, such as initiated CVD (iCVD), the use of plasma presents the advantage that it can be operated at atmospheric pressure allowing its possible integration in existing production lines and achievement of high deposition rate of functionalized layers on large surfaces or on a localized area of a manufacturing piece.

In the present invention, it has been found that by using a quinone group which is a 1,2-benzoquinone group and/or a catechol group which is a 1,2-dihydroxybenzene group, a coating is obtained which is industrially useful. How this works is not fully understood but it is believed that as the quinone group and the catechol group both have 1,2-functionality, the catechol group may easily be oxidised into a quinone group and a quinone group may equally be reduced into being a catechol group. In some embodiments, the precursor comprises at least a vinylic or non-vinylic molecule substituted by one or more quinone group and/or protected or unprotected catechol and/or a natural or synthetic derivative of catechol and/or quinone. In some embodiments, the quinone group is a 1,2-benzoquinone group. In some embodiments, the precursor comprises at least a vinylic or non-vinylic molecule substituted by one or more compounds of formula (VII) and/or a natural or synthetic derivative of a compound of formula (VII), wherein the compound of formula (VII) is defined as follows:

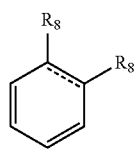

VII wherein both substituents $R_8$ either both represent an optionally protected hydroxyl group or a carbonyl group wherein the bond between each carbon atom which is substituted by a $R_8$ substituent is a single bond when both $R_8$ substituents represent a carbonyl group and wherein the bond between each carbon atom which is substituted by a $R_8$ substituent is a double bond when both $R_8$ substituents represent an optionally protected hydroxyl group.

In some embodiments, the precursor may be a vinylic or non-vinylic molecule substituted by a quinone group and/or a protected or unprotected catechol and/or a polymer substituted by at least a quinone group and/or a protected or unprotected catechol group. Such a precursor may be used with other vinylic- or non-vinylic co-monomer(s) in the present invention. In some embodiments, the precursor is one or more of:

a vinyl monomer substituted by a quinone group and/or a protected or unprotected catechol group;

a non-vinylic molecule substituted by a quinone group and/or a protected or unprotected catechol group;

a natural or synthetic polymer substituted by a quinone group and/or a protected or unprotected catechol group;

a vinyl monomer substituted by a quinone group and/or a protected or unprotected catechol group with a vinylic or a non vinylic co-monomer;

a non-vinylic molecule substituted by a quinone group and/or a protected or unprotected catechol quinone group with a vinylic or a non vinylic co-monomer; and/or a natural or synthetic polymer substituted by at least a quinone group and/or a protected or unprotected catechol group with a vinylic or a non vinylic co-monomer.

In some embodiments, a vinyl monomer substituted by a catechol group suitable for use as a precursor in the present invention may be a compound of general formula (I):

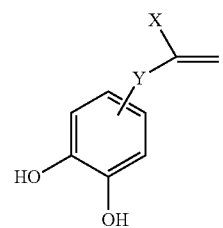

I wherein Y represents a covalent bond or a linking group such as an optionally substituted alkyl, amide or ester group and X represents an alkyl group or hydrogen. In some embodiments, an optional substituent for Y is an alkyl, amide or ester group. In some embodiments, an amide group represented by Y may be:

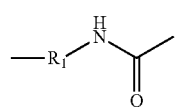

wherein $R_1$ represents an alkyl group. In some embodiments, an ester group represented by Y may be:

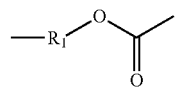

wherein $R_1$ represents an alkyl group. In some embodiments, X represents methyl or hydrogen. In some embodiments, an alkyl group is a straight or branched chain, substituted or unsubstituted alkyl group having from 1 to 6 carbon atoms.

In some embodiments, a vinyl monomer bearing a catechol group suitable for use as a precursor in the present invention may be a compound of formula:

IA
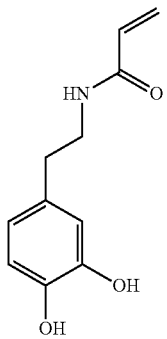

IB
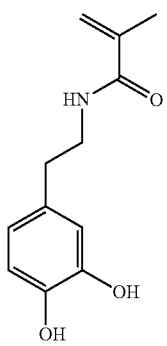

IC
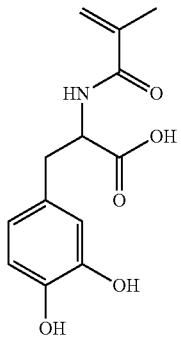

ID
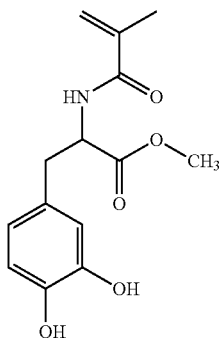

IE
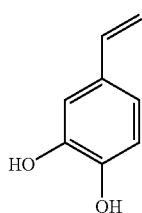

In some embodiments, the vinyl-monomer substituted by a catechol group of formula (I) may be used alone or with an additional vinyl co-monomer. A suitable vinyl monomer is any vinyl monomer able to be (co)polymerized by plasma. Typical examples include an acrylate, methacrylate, styrene and derivatives, vinyl ester, vinyl amide, acrylonitrile, methacrylonitrile, acrylamide, methacrylamide, unsaturated vegetable oil, fatty acid, acrylic acid, methacrylic acid, vinyl alkoxysilanes, vinyltrimethoxysilane, and/or ethylene. In particular, where the vinylic co-monomer is a liquid, a liquid vinylic co-monomer can be used as both a co-monomer and a solvent to dissolve a solid vinyl-monomer substituted by a catechol group of formula (I).

In some embodiments, the vinyl monomer substituted by a catechol group of formula (I) may be used alone or with an additional non-vinylic co-monomer such as a siloxane-forming material, for example hexamethyldisiloxane, hexamethyldisilazane, octamethylcyclotetrasiloxane, decamethylcyclopentasiloxane, dodecamethylcyclohexasiloxane, hexaethyldisiloxane, tetraethylorthosilicate, tetramethyldisiloxane, pentamethylcyclopentasiloxane, octamethylcyclooctasiloxane, and/or polydimethylsiloxane and its derivatives. In particular, where the non-vinylic co-monomer is a liquid, a liquid non-vinylic co-monomer can be used as both a comonomer and a solvent to dissolve a solid vinyl-monomer substituted by a catechol group of formula (I). The use of a non-vinylic monomer may allow the formation of a matrix including the catechol/quinone functional groups. This matrix may ensure the film has mechanical and chemical stability, thus providing improved ageing properties.

In some embodiments, a vinyl monomer substituted by a quinone group suitable for use as a precursor in the present invention may be a compound of general formula (II):

II
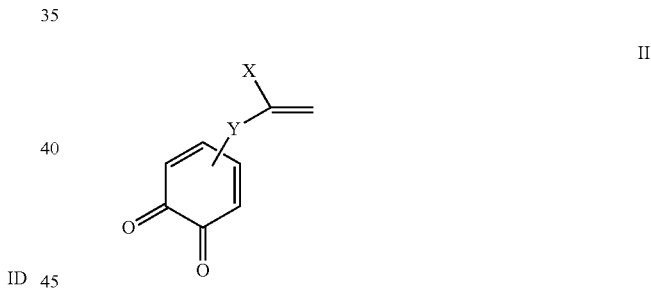

wherein Y and X are as defined above for the compound of general formula (I)

In some embodiments, the vinyl-monomer substituted by a quinone group of formula (II) may be used alone or with an additional vinyl co-monomer. A suitable vinyl monomer is any vinyl monomer able to be (co)polymerized by plasma. Typical examples include an acrylate, methacrylate, styrene and derivatives, vinyl ester, vinyl amide, acrylonitrile, methacrylonitrile, acrylamide, methacrylamide, unsaturated vegetable oil, fatty acid, acrylic acid, methacrylic acid, vinyl alkoxysilanes, vinyltrimethoxysilane, and/or ethylene. In particular, where the vinylic co-monomer is a liquid, a liquid vinylic co-monomer can be used as both a co-monomer and a solvent to dissolve a solid vinyl-monomer substituted by a quinone group of formula (II).

In some embodiments, the vinyl monomer substituted by a quinone group of formula (II) may be used alone or with an additional non-vinylic co-monomer such as a siloxane-forming material, for example hexamethyldisiloxane, hexamethyldisilazane, octamethylcyclotetrasiloxane, decamethylcyclopentasiloxane, dodecamethylcyclohexasiloxane, hexaethyldisiloxane, tetraethylorthosilicate, tetramethyldisiloxane, pentamethylcyclopentasiloxane, octamethylcyclooctasiloxane, and/or polydimethylsiloxane and its derivatives. In particular, where the non-vinylic co-monomer is a liquid, a liquid non-vinylic co-monomer can be used as both a co-monomer and a solvent to dissolve a solid vinyl-monomer substituted by a quinone group of formula (II). The use of a non-vinylic monomer may allow the formation of a matrix including the catechol/quinone functional groups. This matrix may ensure the film has mechanical and chemical stability, thus providing improved ageing properties.

In general, a non-vinylic molecule substituted by a catechol group is a molecule bearing at least one catechol group with no polymerizable double bonds. In some embodiments, a non-vinylic molecule substituted by a catechol group suitable for use in the present invention as a precursor may be a compound of general formula (III):

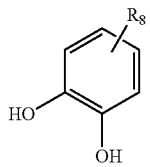

III wherein $R_8$ represents one or more optionally substituted alkyl, cycloalkyl, heterocycloalkyl, and/or aromatic groups or two or more $R_8$ substituents in combination represent a polycyclic cycloalkyl, heterocycloalkyl and/or aromatic group. A suitable substituent is a hydrogen or halogen atom or a hydroxy, amine, amide, ester, ether and/or carboxylic acid group.

In some embodiments, a non-vinylic molecule substituted by a catechol group for use in the present invention as a precursor may be a compound of formula:

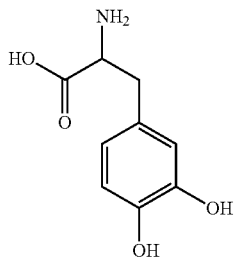

IIIA

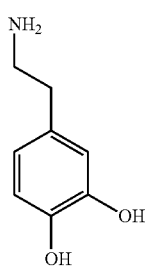

IIIB

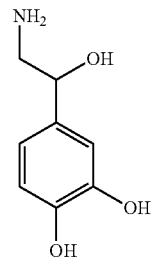

IIIC

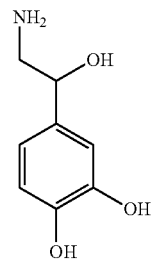

IIID

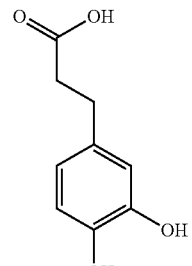

IIIE

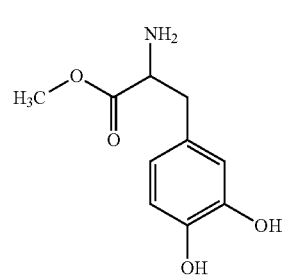

IIIF

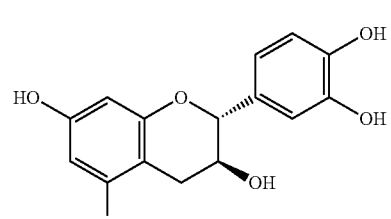

IIIG

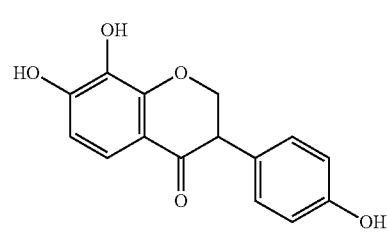

IIIH

In some embodiments, the molecule substituted by catechol may be dopamine, 1,2-dihydroxybenzene, a dihydroxyphenyl derivative (DHPD) and/or a polyphenol such as a tannin.

DHPD molecules suitable for use in the present invention are known from WO2008019352. In some embodiments, a suitable DHPD molecule may be a compound of general formula (IV):

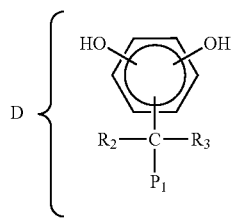

wherein $R_2$ and $R_3$ may be the same or different and may independently represent a hydrogen atom or a saturated or unsaturated, branched or unbranched, substituted or unsubstituted $C_{1-4}$ hydrocarbon group; $P_1$ represents separately and independently —$NH_2$, —COOH, —OH, —SH,

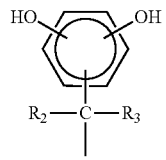

wherein $R_2$ and $R_3$ are defined above,
a single bond, halogen,

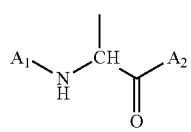

wherein each of $A_1$ and A2 independently represents a hydrogen atom;
a protecting group,
substantially poly(alkyleneoxide),

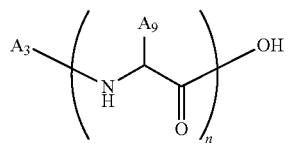

wherein n represents an integer from 1 to 3, $A_9$ represents a hydrogen atom or an alkyl, ester, ether or amide group and $A_3$ represents

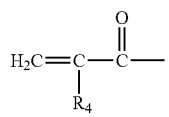

wherein $R_4$ represents H, $C_{1-6}$ lower alkyl, or

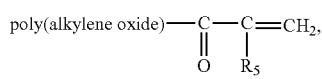

wherein $R_5$ represents a hydrogen atom or a saturated or unsaturated, branched or unbranched, substituted or unsubstituted $C_{1-4}$ hydrocarbon group, and
D has a value of from 1 to 50.

In some embodiments, D has a value of from 1 to 25. In some embodiments, D represents a number which is an integer. In some embodiments, the poly(alkylene oxide) substituent has the structure

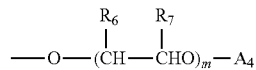

wherein $R_6$ and $R_7$ separately and independently represent a hydrogen atom or —$CH_3$ and m has a value in the range of from 1 to 250, $A_4$ represents —$NH_2$, —COOH, —OH, —SH, —H or a protecting group.

In some embodiments, a suitable compound of formula (IV) is

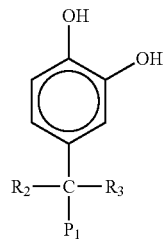

wherein $R_2$, $R_3$ and $P_1$ are as defined above.

In some embodiments, a suitable compound of formula (IV) is:

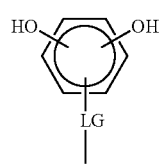

wherein LG represents a linking group and is chosen from oligomers of substantially poly(alkylene oxide), acrylate, methacrylate, vinyl groups, and their derivatives, or having chemical structure —$[C(R_2)(R_3)]_x$—$P_2$ wherein $R_2$ and $R_3$ are as defined above. P2 represents —$NH_2$, —COOH, —OH, —SH, a single bond, halogen, —NH-$A_5$-, —C(O)$A_6$, —CH(NH$A_5$)—C(O)-$A_6$ wherein $A_5$- represents —H, —C, a single bond, a protecting group, substantially alkyl, poly(alkylene oxide), a peptidal, acrylated, and/or methacrylated group, or is as defined for $A_1$ and $A_2$; and wherein A6 represents —OH, —$NH_2$ or is as defined for $A_1$ and $A_2$.

In some embodiments, a suitable compound of formula (IV) is:

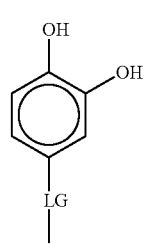

wherein LG is defined above.

In some embodiments, DHPD for use as the derivative of catechol and/or quinone may be 3,4-dihydroxyphenylalanine (DOPA), dopamine, or 3,4-dihydroxyhydrocinnamic acid (DOHA), as well as precursors and further derivatized forms of said compounds. Examples of precursors include but are not limited to tyrosine, tyramine, hydrocinnamic acid, phenylalanine, benzenepropanoic acid, benzylethamine, 2,4,5-trihydroxyphenylalanine and other phenolic or benzyl compounds that can be hydroxylated or dehydroxylated to form DHPD. Examples of further derivatized forms of DHPD include DHPD with protecting group(s), DHPD bound to a metal ion on the hydroxyl group(s), or DHPD modified with acrylate, methacrylate, substantially poly(alkylene oxide), peptide or oligomer containing DHPD and its precursors, and the combination thereof.

In some embodiments, non-vinylic molecule bearing catechol groups, such as the compound of general formula (III) or the compound of general formula (IV) as defined above may be used alone or with a vinyl-co-monomer. A suitable vinyl monomer is any vinyl monomer able to be (co)polymerized by plasma. Typical examples include an acrylate, methacrylate, styrene and derivatives, vinyl ester, vinyl amide, acrylonitrile, methacrylonitrile, acrylamide, methacrylamide, unsaturated vegetable oil, fatty acid, acrylic acid, methacrylic acid, vinyl alkoxysilanes, vinyltrimethoxysilane, and/or ethylene. In particular, where the vinylic co-monomer is a liquid, a liquid vinylic co-monomer can be used as both a co-monomer and a solvent to dissolve a solid compound of formula (III) or of formula (IV).

In some embodiments, non-vinylic molecule bearing catechol groups, such as the compound of general formula (III) or the compound of general formula (IV) as defined above may be used alone or with an additional non-vinylic co-monomer such as a siloxane-forming material, for example hexamethyldisiloxane, hexamethyldisilazane, octamethylcyclotetrasiloxane, decamethylcyclopentasiloxane, dodecamethylcyclohexasiloxane, hexaethyldisiloxane, tetraethylorthosilicate, tetramethyldisiloxane, pentamethylcyclopentasiloxane, octamethylcyclooctasiloxane, and/or polydimethylsiloxane and its derivatives. In particular, where the non-vinylic co-monomer is a liquid, a liquid non-vinylic co-monomer can be used as both a co-monomer and a solvent to dissolve a compound of general formula (III) or compound of general formula (IV). The use of a non-vinylic monomer may allow the formation of a matrix including the catechol/quinone functional groups. This matrix may ensure the film has mechanical and chemical stability, thus providing improved ageing properties.

In general, a non-vinylic molecule substituted by a quinone group is any molecule bearing at least one quinone group with no polymerizable carbon-carbon double bonds. In some embodiments, a non-vinylic molecule substituted by a quinone group suitable for use in the present invention as a precursor is a compound of general formula (V):

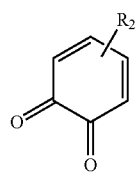

V wherein optional substituent $R_2$ is as defined above. A typical example is 1,2-quinone.

In some embodiments, the non-vinylic compound of general formula (V) may be used alone or with a vinylic co-monomer. A suitable vinyl monomer is any vinyl monomer able to be (co)polymerized by plasma. Typical examples include an acrylate, methacrylate, styrene and derivatives, vinyl ester, vinyl amide, acrylonitrile, methacrylonitrile, acrylamide, methacrylamide, unsaturated vegetable oil, fatty acid, acrylic acid, methacrylic acid, vinyl alkoxysilanes, vinyltrimethoxysilane, and/or ethylene. In particular, where the vinylic co-monomer is a liquid, a liquid vinylic co-monomer can be used as both a co-monomer and a solvent to dissolve a solid compound of formula (V).

In some embodiments, the non-vinylic compound of general formula (V) may be used alone or with a non-vinylic co-monomer such as a siloxane-forming material, for example hexamethyldisiloxane, hexamethyldisilazane, octamethylcyclotetrasiloxane, decamethylcyclopentasiloxane, dodecamethylcyclohexasiloxane, hexaethyldisiloxane, tetraethylorthosilicate, tetramethyldisiloxane, pentamethylcyclopentasiloxane, octamethylcyclooctasiloxane, and/or polydimethylsiloxane and its derivatives. In particular, where the non-vinylic co-monomer is a liquid, a liquid non-vinylic co-monomer can be used as both a co-monomer and a solvent to dissolve a compound of general formula (V). The use of a non-vinylic monomer may allow the formation of a matrix including the catechol/quinone functional groups. This matrix may ensure the film has mechanical and chemical stability, thus providing improved ageing properties.

A polymer bearing catechol for use in the invention may be any polymer, synthetic or not, that is substituted by at least one catechol group at the chain end and/or along the chain. In some embodiments, a polymer bearing catechol that may be used in the present invention include a poly(dopamine) of formula (VIa), a polymer of formula (VIb) which is a poly(caffeic acid), a polymer of formula (VIc) wherein R represents an alkyl group or hydrogen (generally R represents methyl or hydrogen) and ⌇ represents a linker between the main polymer backbone and the catechol group, a poly(dopamine acrylamide) of formula (VId) which is a poly(dopamine acrylamide), a polymer of formula (VIe) which is oxidized poly(dopamine acrylamide) and a polymer of formula (VIf) which is a tannin:

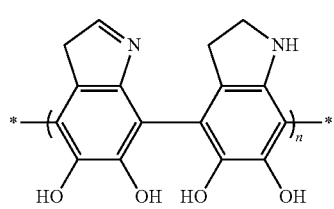

VIa

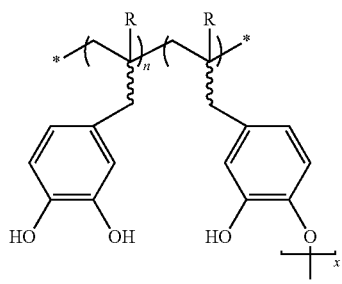

VIb

Hyperbranched architecture or gel formation

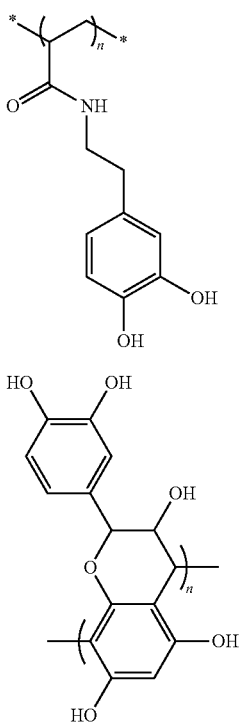

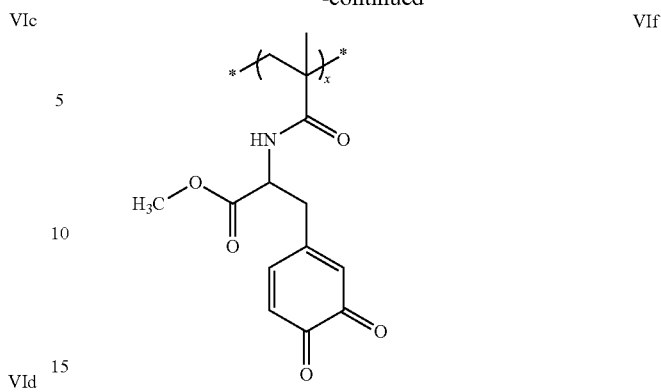

In some embodiments, a polymer bearing catechol as defined above can be used alone deposited from an aqueous solution or from an organic solution or used in mixture with an additional vinyl-co-monomer such as any vinyl monomer able to be (co)polymerized by plasma. Typical examples include an acrylate, methacrylate, styrene and derivatives, vinyl ester, vinyl amide, acrylonitrile, methacrylonitrile, acrylamide, methacrylamide, unsaturated vegetable oil, fatty acid, acrylic acid, methacrylic acid, vinyl alkoxysilanes, vinyltrimethoxysilane, and/or ethylene.

In some embodiments, a polymer bearing catechol as defined above can be used alone or in mixture with an additional non-vinylic-co-monomer such as a siloxane-forming material, for example hexamethyldisiloxane, hexamethyldisilazane, octamethylcyclotetrasiloxane, decamethylcyclopentasiloxane, dodecamethylcyclohexasiloxane, hexaethyldisiloxane, tetraethylorthosilicate, tetramethyldisiloxane, pentamethylcyclopentasiloxane, octamethylcyclooctasiloxane, and/or polydimethylsiloxane and its derivatives.

A polymer bearing quinone for use in the invention may be any polymer, synthetic or not, that is substituted by at least one quinone group at the chain end and/or along the chain. In some embodiments, a polymer bearing quinone for use in the present invention may be poly(caffeic acid) of formula VIe and/or oxidized poly(dopamine acrylamide) of formula VIf.

In some embodiments, a polymer bearing quinone as defined above of formula (VIe) or of formula (VIf) can be used alone deposited from an aqueous solution or from an organic solution or used in mixture with an additional vinyl-co-monomer such as any vinyl monomer able to be (co)polymerized by plasma. Typical examples include an acrylate, methacrylate, styrene and derivatives, vinyl ester, vinyl amide, acrylonitrile, methacrylonitrile, acrylamide, methacrylamide, unsaturated vegetable oil, fatty acid, acrylic acid, methacrylic acid, vinyl alkoxysilanes, vinyltrimethoxysilane, and/or ethylene.

In some embodiments, a polymer bearing quinone as defined above of formula (VIe) or of formula (VIf) can be used alone or in mixture with an additional non-vinylic-co-monomer such as a siloxane-forming material, for example hexamethyldisiloxane, hexamethyldisilazane, octamethylcyclotetrasiloxane, decamethylcyclopentasiloxane, dodecamethylcyclohexasiloxane, hexaethyldisiloxane, tetraethylorthosilicate, tetramethyldisiloxane, pentamethylcyclopentasiloxane, octamethylcyclooctasiloxane, and/or polydimethylsiloxane and its derivatives.

In some embodiments, the molar mass of the polymer bearing catechol or quinone for use as the precursor may be from 1000 g/mol to $10 \times 10^6$ g/mol, preferably from 2000 g/mol to $5 \times 10^6$ g/mol.

A polymer substituted by a catechol and/or quinone group for use in the invention may be linear, branched, (hyper) branched, star-like, etc. A polymer substituted by a catechol and/or quinone group for use in the invention may be a random, alternative or block(-like) structure. The polymer can be a synthetic copolymer such as described in the scheme below or a peptide bearing catechol. The (co) polymer can be neutral or negatively or positively charged.

(1)

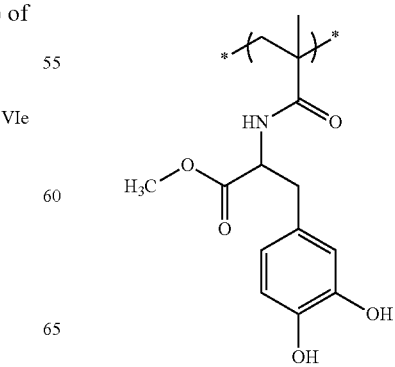

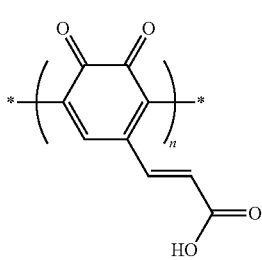

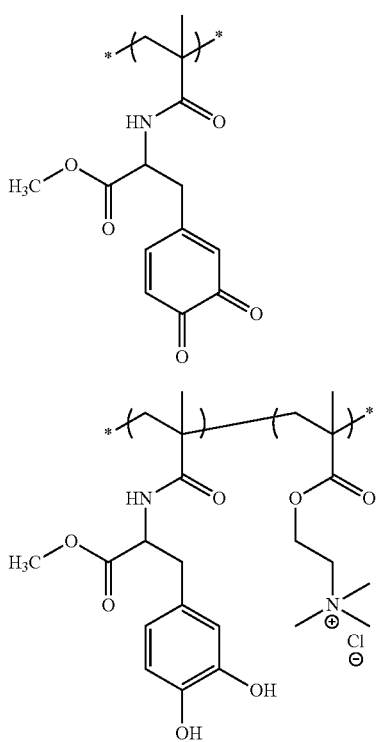

(2)

(3)

In some embodiments, a catechol substituted molecule or polymer may be protected. A protected catechol substituted molecule or polymer may be used alone or in mixture with vinylic or non-vinylic co-monomers in the present invention. Examples of suitable protecting groups include an alkyl group or a silane group. An alternative protecting group would be well known to a person of skill in the art, for example, examples of suitable protecting groups can be found in "Greene's protective groups in organic synthesis", 4th edition, P.G.M. Wuts, T.W. Greene; Wiley-Interscience, 2007, John Wiley & Sons, Inc. Examples of vinyl monomers bearing protected catechol include:

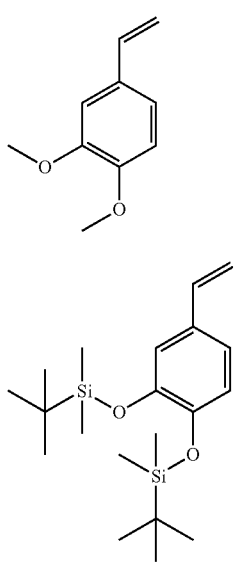

If

Ig

In some embodiments, in step (b) an organic and/or inorganic (nano) particles such as metallic (nano) particles for example elemental metals (Ag or Au), metal oxides ($Al_2O_3$, ZnO, $Fe_2O_3$ and/or $Fe_3O_4$), metal halides (AgCl or AgBr), metal sulfides (PbS, CdS and/or $Ag_2S$), can be added to the precursor to be used for plasma polymerization (step (c)) of the method of the invention.

In some embodiments, the method of the invention comprises a step (b1) wherein a polymerization initiator agent is injected into the precursor before step (c).

Alternatively, in some embodiments of the method, the polymerization initiator agent may be injected into the deposition chamber at the beginning of step (c) or during all the duration of step (c)

In some embodiments, the polymerization initiator agent can be a free radical initiator. The latter is an agent which produces free radicals, for example a precursor such as an azo compound, peroxide or peroxy ester, which generate radicals by thermolysis, photolysis or upon exposure to plasma. It is also possible to generate a free radical by a photochemical system and/or by high energy radiation such as beam or X- or γ-radiation.

Examples of suitable free radical initiators include 4,4'-azobis(4-cyanopentano acid), 2,2'-azobis[2-methyl-N-(1,1-bis-(hydroxymethyl)-hydroxyethylpropionamide], 2,2'-azobis(2-methylpropionamidine)dihydrochloride, 2,2'-azobis[2-methyl-N-(2-hydroxyethyl)propionamide], 2,2'-azobis(isobutyramidine hydrochloride), 2,2'-azobis[2-methyl-N-(1,1-bis(hydroxymethyl)-2-ethyl)-propionamide], 2,2'-azobis[2-(2-imidazolin-2-yl)propane]dihydrochloride, 2,2'-Azobis[N-(2-carboxyethyl)-2-methylpropionamidine] hydrate, 2,2'-Azobis{2-[1-(2-hydroxyethyl)-2-imidazolin-2-yl]propane}dihydrochloride, 2,2'-Azobis(1-imino-l-pyrrolidino-2 ethylpropane)dihydro chloride, 2,2'-Azobis{2-methyl-N-[1,1-bis(hydroxymethyl)-2-hydroxyethyl]propionamide}, 2,2'-azobis[2-methyl-N-(2-hydroxyethylpropionamide], 2,2'-azobis(isobutylamide) dihydrate, azoinitiators having polyethylene glycol unit (products commercialized by Wako Chemicals GmbH, Germany, under the Trademark VPE 0201, VPE 0401 and VPE 0601). Potassium peroxydisulfate, ammonium peroxydisulfate, di-tert-butyl hyponitrite, dicumyl hyponitrite and hydrogen peroxide can be used, but can potentially induce the oxidation of the dihydroxyphenyl moieties into their quinone form. The extent of oxidation will depend on the proportion of the initiator introduced during the plasma polymerisation.

In some embodiments, an initiator generating radicals by photolysis may be used in step (b), for example a benzoin derivative, benzophenone, an acyl phosphine oxide and/or a photoredox system.

In some embodiments, an initiator generating radicals as a result of a redox reaction may be used in step (b), for example a combination of an oxidant and a reducing agent. A suitable oxidant is, for example, potassium peroxydisulfate, ammonium peroxy disulfate, hydrogen peroxide, tert-butyl hydroperoxide. A suitable reducing agent is, for example, a Fe(II) salt, Ti(III) salt, potassium thiosulfate, potassium bisulfite, ascorbic acid and salts thereof, oxalic acid and salts thereof, dextrose and Rongalite (Registered Trademark) (sodium formaldehyde sulfoxylate, BASF AG, Ludwigshafen, Germany). In some embodiments, the reducing agent should be carefully chosen in order to limit oxidation of the dihydroxyphenyl moieties by the oxidant.

In some embodiments, the plasma used in step (c) of the method of the invention may be a non-equilibrium plasma process operating at a low, medium or atmospheric pressure.

In some embodiments, the method of the invention is performed in a plasma deposition chamber. In some embodiments, step (a) of the method of the invention comprises providing a plasma deposition chamber. In some embodiments, step (c) of the method of the invention comprises forming a functionalised layer on a surface portion of the substrate which is contacted by the precursor.

In some embodiments, an electrical excitation may be used in step (c) for the generation of the plasma. In some embodiments, the electrical excitation may comprise an electrical signal having a frequency in the following ranges: from 1 to 500 KHz (low frequency) and from 0.1 to 2.45 GHz (Microwave). In some embodiments, the electrical excitation may comprise a radiofrequency signal, equalled to 13.56 MHz, 27.12 MHz, 40.68 MHz or 81.36 MHz.

In some embodiments, the electrical signal can be delivered in a continuous or pulsed wave form. In some embodiments, the plasma discharge can be run in pulsed mode alternating ON period (ton) burst with OFF period (toff). Within these conditions, activation and/or dissociation of the monomers and generation of active sites on the surface occurs during ton while along the toff, polymerization can occur without the interference of charged species investing the sample. In some embodiments, to obtain an adherent layer containing a large number of catechol/quinone groups which are available for interfacial reaction, the plasma OFF period duration may be more important than the ON period. As a result, step (c) of the method according to the invention may have a low or extremely low Duty Cycle (DC). The Duty Cycle may be calculated as follows:

DC, %=$t$on/($t$on+$t$off)*100

In some embodiments, the Duty Cycle may depend upon the type of electrical generator used. For example, for a sinusoidal chopped electrical generator, the Duty Cycle may be from 1 to 50% with a ON period that can vary, for example, from 1 ms to 30 ms. For a short square pulsed electrical generator, the Duty Cycle may be from 0.01 to 1% with ON periods varying in a range of from 1 to 50 µs and/or from 100 to 500 ns.

In some embodiments, step (c) of the method of the invention comprises the use of a gas. In some embodiments, an inert gas (such as nitrogen) or a noble gas (such as argon or helium) can be used by itself. In some embodiments, a gas mixture is used such as an inert or noble gas with an oxidant gas (such as $O_2$, $H_2O$ vapour) or reducing gas (such as $H_2$ or ammonia).

In some embodiments, step (c) in the method of the invention requires the use of a precursor injection system in order to introduce the precursor (step b) in the deposition chamber, thus placing it in contact with the substrate (step a) and the plasma. Depending on the physical properties of a selected precursor, different kinds of precursor injection systems can be used.

In some embodiments, where step (c) of the method of the invention operates by using an atmospheric plasma process, and where the precursor is a liquid having a high vapour pressure, the injection of precursor into the deposition chamber can be carried out by using a bubbler system. For non-heat sensitive liquid precursors, the introduction of precursor vapours into the deposition chamber can be improved by using a heated bubbler system.

In some embodiments, where step (c) of the method of the invention operates by using an atmospheric plasma process, and where the precursor is a liquid having a low vapour pressure, the injection of precursor into the deposition chamber can be carried out by nebulizer/spraying systems.

In some embodiments, where step (c) of the method of the invention operates by using an atmospheric plasma process, and where the precursor is a non-heat sensitive solid, the injection of precursor into the deposition chamber can be carried out by first melting the precursor and then by using a nebulizer system or an ultrasonic atomizer spray nozzle. Alternatively, for a non-heat sensitive precursor with a high sublimation temperature, the precursor injection can be carried out and controlled by heating and by using a vapour flow controller system, respectively.

In some embodiments, where step (c) of the method of the invention operates by using a low pressure plasma process, and where the precursor is a solid placed in a container, the injection of precursor into the deposition chamber can be controlled by using a mass flow controller or a micro-leak valve installed in the precursor line to control the flux of the sublimated precursors.

In some embodiments, where step (c) of the method of the invention operates by using a low pressure plasma process, and where the precursor is a liquid placed in a container, the injection of precursor into the deposition chamber can be done by using a nebulizer system or an ultrasonic atomizer spray nozzle.

The precursor injection systems described above, are given as examples without restricting the possibility to use other kinds of precursor injection systems. The above precursor injection systems can also be used for the plasma deposition of a polymer bearing catechol and/or quinone group.

In some embodiments, the injection position of the precursor(s) in the plasma deposition chamber may be selected. In some embodiments, one of three different injection positions of the precursors may be used:
a. injection in the plasma discharge zone,
b. injection in the plasma post-discharge zone,
c. deposition on the substrate surface before contact with the plasma discharge or post-discharge zone.

In some embodiments, the coating may be a highly functionalised coating having a high number of catechol and/or quinone substituent groups, for example from $1\times10^{11}$ to $1\times10^{18}$ functional groups per $cm^2$. In some embodiments, the coating may be on the whole or part of a surface of a substrate. In some embodiments, the substantially solvent-free coating on the substrate according to the invention may have no detectable amount of a solvent which is not a compound described herein as being suitable for use in the method of the present invention.

In some embodiments, the substrate used in the invention may be an inorganic or organic substrate. A suitable inorganic substrate may be or a metal substrate, for example a nickel, titanium, steel, stainless steel or aluminium substrate or a ceramic substrate, for example a glass or silicon wafer. A suitable organic substrate is a polymeric substrate, for example nylon, polyamide, polyurethane, polyester, polytetrafluoroethylene, polystyrene, polypropylene, polyethylene substrate. In some embodiments, the substrate may be in the form of a mesh. In some embodiments, the substrate may be a pre-coated substrate; for example a metallized polymer, metallized glass, painted polymer or painted metal.

In some embodiments, the catechol and/or quinone functionalized surface can have the ability to form irreversible (covalent bond) or reversible (hydrogen bond, electron π-π interaction) chemical crosslinks either with other catechol/quinone groups or other functional groups (e.g. amine, thiol, imidazoles, hydroxyl, or carboxyl groups), or other reactive groups.

In some embodiments, the adherent coating obtained by the method of the invention is a catechol and/or quinone functionalized layer. The coated substrate according to the invention is useful for interaction with a biomolecule. This is because the coating is believed to act as an interfacial adhesive. In some embodiments, the coated substrate according to the invention comprises a biomolecule.

In some embodiments, the biomolecule may be a bioactive molecule and/or a natural or synthetic peptide or protein, for example an enzyme. In some embodiments, the biomolecule, in its free form (i.e. before immobilization onto the coated substrate) contains at least functional group which may be at least one amino group and/or at least one thiol group. This functional group is believed to allow a convenient reaction with a quinone form of the oxidized dihydroxyphenyl group contained in the coated substrate according to the invention and in very mild reaction conditions (such as ambient temperature and aqueous solution). A biomolecule may be chemically, generally covalently, grafted to the coated substrate by the reaction of one or more of its amino groups and/or thiol groups with quinone functions of the coating. The biomolecule may be selected to impart additional functionality to the coating. For instance, when antimicrobial activity is desired, an antimicrobial peptide and/or protein from a bacterial, fungal, vegetal, animal, human origin or any analogous chemical structures obtained by de novo design and chemical synthesis can be used. Similarly, an antibacterial substance can be used. Examples include: nisin, lysozyme, natamycine and/or melimine peptides. Further examples of organic antibacterial molecules are chitosan or other antibacterial molecules well-known in the art like triclosan, isothiazolinones, etc. Other examples of biomolecules of interest are polysaccharides; an example of an antimicrobial polysaccharide is chitosan. Similarly, an antibiofilm biomolecule or synthetic substance can be used such as dispersine B. In some embodiments, a coated substrate may comprise an antibacterial metal nanoparticle such that catechol groups of the coating of the coated substrate can be exploited to form and stabilize to the surface antibacterial metal nanoparticles such as silver nanoparticles.

When water depollution is targeted such as antibiotic degradation, a biomolecule may be an enzyme including but not limited to beta-lactamase. Other biomolecules may also be selected depending upon the intended use of the coated substrate.

FIGURES

The present invention is illustrated by way of example by the Figures of the accompanying drawings, in which:

FIG. 7 shows a schematic cross-sectional view of a first embodiment of a coated substrate according to the invention; and FIG. 8 shows a schematic cross-sectional view of a second embodiment of a partially coated substrate according to the invention.

DETAILED DESCRIPTION

Figure 1:
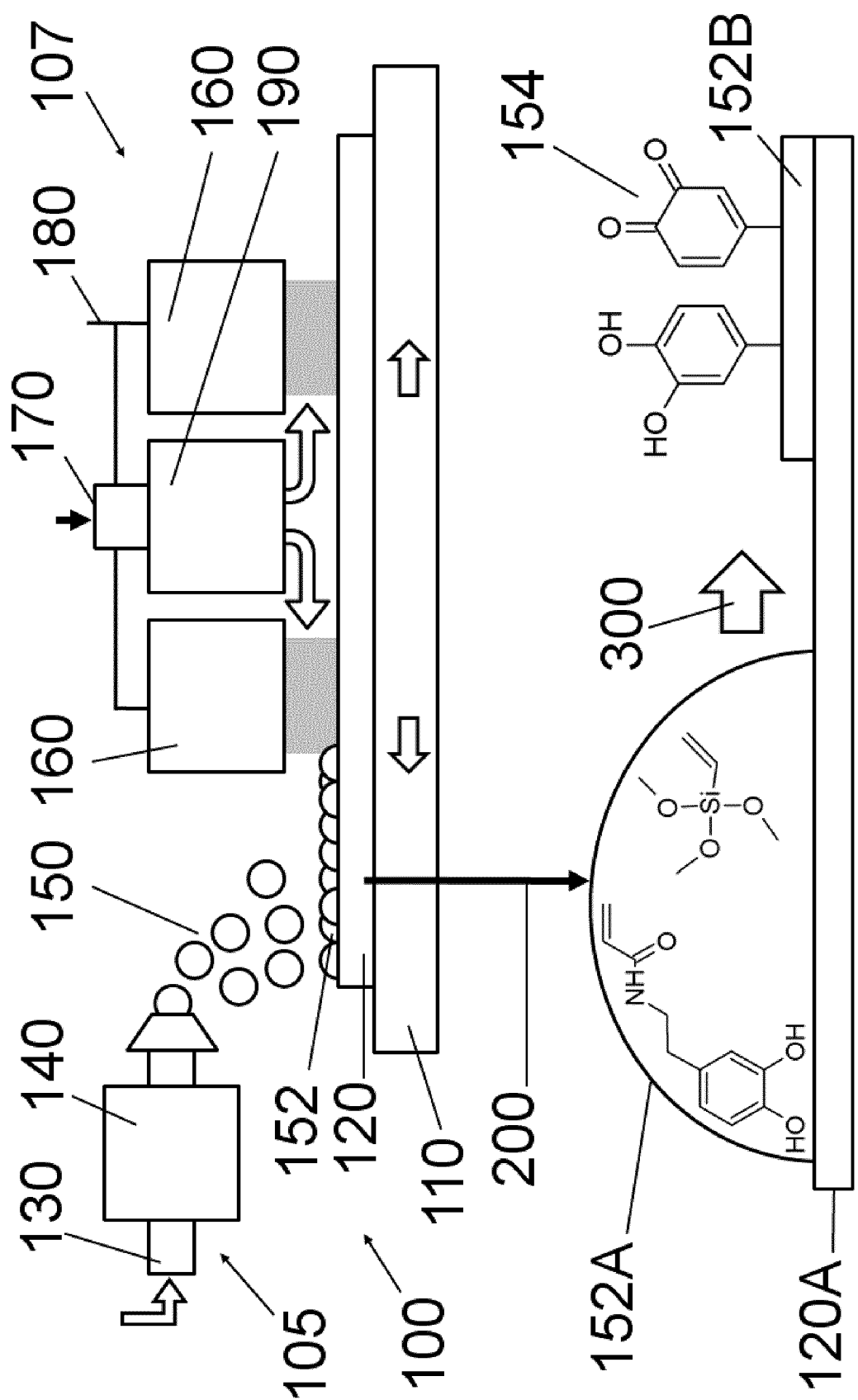
FIG. 1 shows a schematic cross-sectional view of a first atmospheric pressure plasma deposition chamber to be used in the invention.

A first atmospheric pressure plasma deposition chamber is indicated generally at 100 on FIG. 1 of the drawings. Chamber 100 comprises a spray system indicated generally at 105, a plasma generation system indicated generally at 107, a moving table 110 and an inorganic or organic substrate 120. The spray system 105 has a precursor inlet 130 and an ultrasonic spray system 140 which generates microdroplets 150 which when directed against the substrate 120 in step 200 forms an initial coating layer 152. In some embodiments, the ultrasonic spray system 140 may be a 48 kHz ultrasonic atomising nozzle (Sono-Tek Corporation). The plasma generation system 107 has a pair of electrodes 160, a gas flux inlet 170, a high voltage circuit 180 and a gas outlet 190. The plasma generation system 107 is arranged vertically above the moving table 110 and is spaced from the substrate 120. When a plasma is generated in step 300, an adhered organic functionalised coating layer 152B is formed on the substrate 120A. The adhered organic functionalised coating layer 152B has functional catechol and/or quinone groups indicated at 154.

Figure 5:
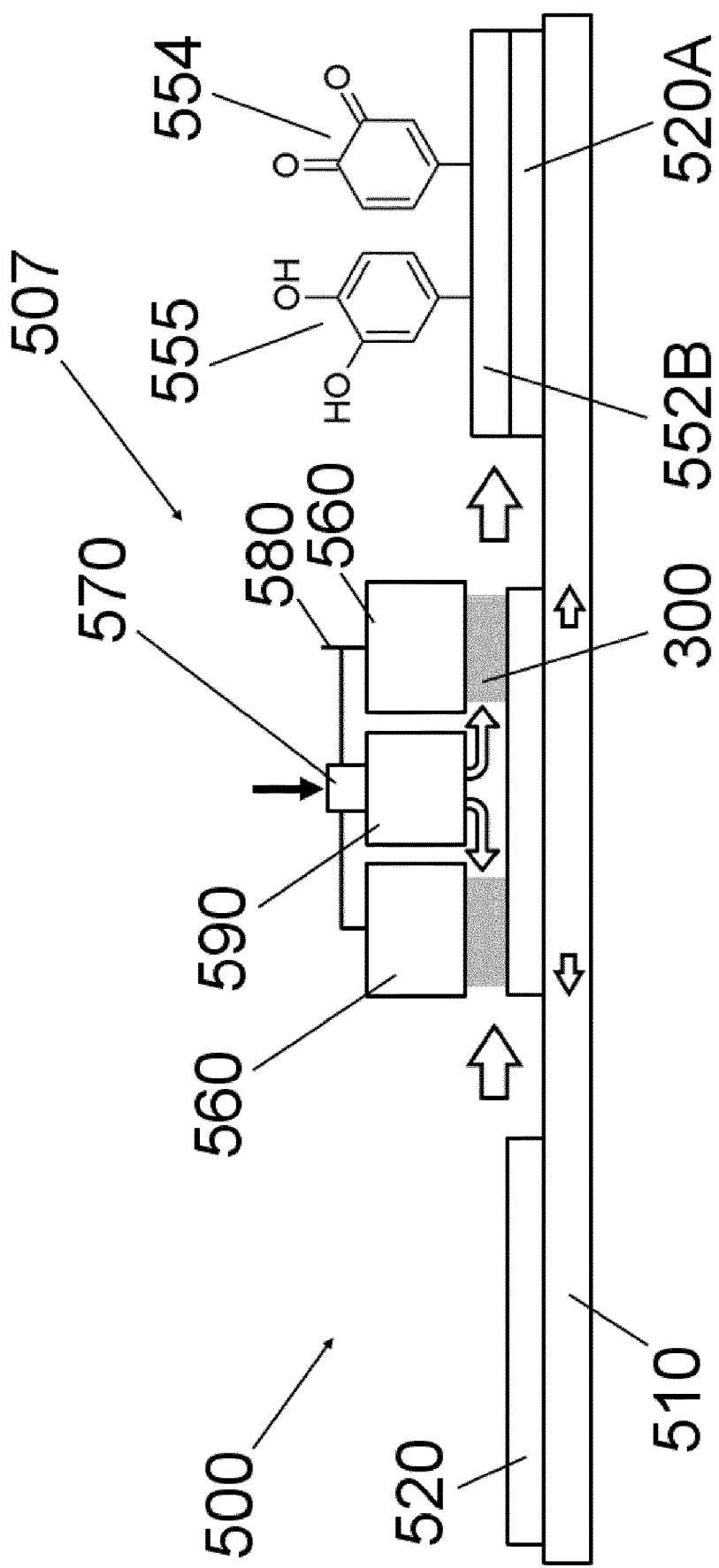
FIG. 5 shows a schematic cross-sectional view of a second atmospheric pressure plasma deposition chamber to be used in the invention.

A second atmospheric pressure plasma deposition chamber is indicated generally at 500 on FIG. 5 of the drawings. Chamber 500 comprises a plasma generation system indicated generally at 507, a moving table 510 and an inorganic or organic substrate 520. The plasma generation system 507 has a pair of electrodes 560, a gas and precursor inlet 570, a high voltage circuit 580 and a gas and precursor outlet 590. The plasma generation system 507 is arranged vertically above the moving table 510 and is spaced from the substrate 520. The gas and precursor introduced by outlet 590 and the substrate 520 are then submitted to a plasma polymerization step 300. A substrate 520A of organic or inorganic material having an adhered coating 552B is generated. The coating 552B is an organic functionalised layer with quinone groups 554 and catechol groups 555

Figure 6:
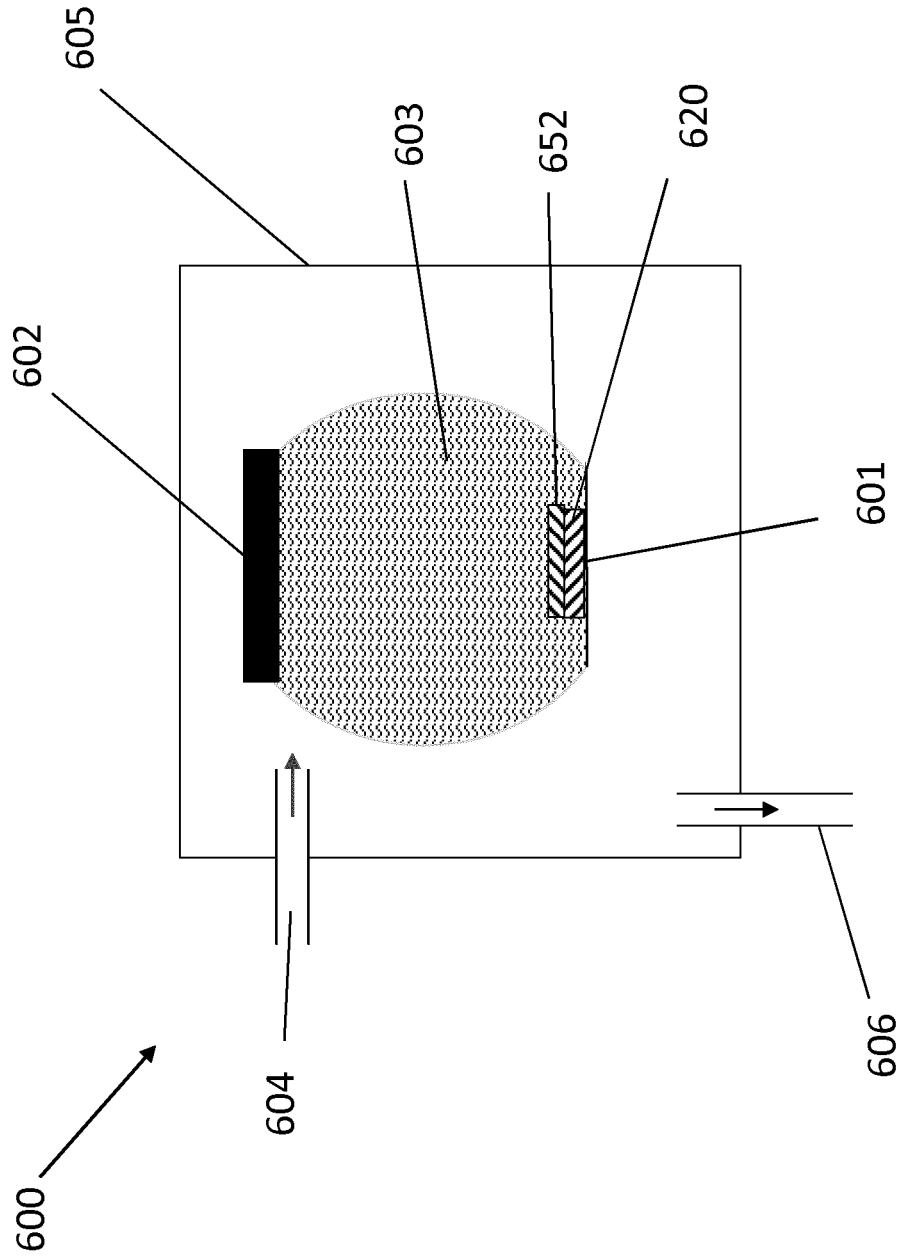
FIG. 6 shows a schematic cross-sectional view of a low pressure plasma deposition chamber to be used in the invention.

A low pressure plasma deposition chamber is indicated generally at 600 on FIG. 6 of the drawings. Chamber 600 comprises a deposition chamber 605, a high voltage electrode 602, a grounded electrode 601, a generated plasma 603, a plasma gas and precursor inlet 604, an outlet 606 connected to a pump, a substrate 620 and a functionalised layer 652.

A coated substrate according to a first embodiment of the invention is indicated generally at 700 in FIG. 7. The coated substrate has a substrate 704 and a solvent-free adhered coating 702. A coated substrate according to a first embodiment of the invention is indicated generally at 800 in FIG. 8. The coated substrate has a substrate 804 and solvent-free adhered coating portions 802A and 802B which partly cover substrate 804.

The present invention will be further illustrated by reference to the following non limiting examples.

PREPARATORY EXAMPLE 1

In this Preparatory Example, the synthesis of N-(3,4-Dihydroxyphenethyl)acrylamide (DOA, molecule (2)) is described.

The synthesis used a modified procedure adopted from Lee et al. [Lee, B. P.; Huang, K.; Nunalee, F. N.; Shull, K. R.; Messersmith, P. B. J. *Biomater. Sci. Polym. Ed.* 2004, 15, 449-464.]. A two-neck round-bottom flask was charged with 12.1 g (31.6 mmol) of $Na_2B_4O_7 \cdot 10H_2O$ and 5.0 g of $Na_2CO_3$, and 475 mL of milli-Q water (18.2 MΩ·cm, Millipore). This basic aqueous solution was degassed in sonicator bath (Branson 2510, 100 W, 42 KHz) for 1 h, applying light vacuum followed by, bubbling with argon for another 2 h. 3 g (15.8 mmol) of Dopamine hydrochloride (molecule 1) was added under argon atmosphere and continued stirring for 30 minutes. The flask was then cooled at 0° C. before drop-wise addition of 5.1 mL (63.2 mmol) of acryloyl chloride with stirring. Another 9.0 g $Na_2CO_3$ was added to maintain the pH of the solution above 9 during the reaction. After stirring for 12 h at room temperature, the solution was acidified to pH 1-2 with 6N HCl and continued stirring for 1 h in an open vessel. The mixture was extracted five times with ethyl acetate, washed with 0.1 M HCl and dried over $MgSO_4$. The solvent was removed in vacuum to yield crude greyish paste, which was further purified by flash silica gel column chromatography eluting with dichloromethane/methanol (9:1) mixture (80% yield).

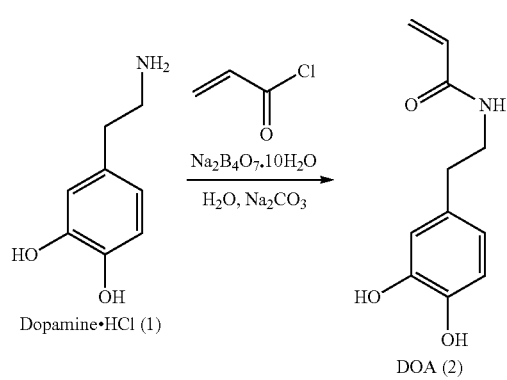

EXAMPLE 2

In this Example, preparation of bio-inspired antibacterial surfaces is described.

The substrates used for deposition are 1 mm thick mirror polished 304 stainless steel disks or aluminium foils. Stainless steel disks were first cleaned by successive ultrasonic washings in butanone (5 min.), acetone (1 min.) and absolute ethanol (1 min) and further dried under a nitrogen flux. Lysozyme from chicken egg, white egg (lyophilized powder, protein ≥90%, ≥40,000 units/mg protein, Aldrich) was used as received.

Before plasma deposition, the metallic substrates were plasma cleaned and activated through an $Ar/O_2$ plasma treatment (19 slm/1 slm (standard litre per minute)) in continuous (CW) discharge mode at 1.6 W/cm² during 30 sec.

A laboratory synthesized dopamine acrylamide (DOA, molecule (2)) prepared as described in Preparatory Example 1 was dissolved at final concentration of 0.5 mg/mL in vinyltrimethoxysilane (VTMOS, 98%, Sigma-Aldrich) for 10 hours at ambient temperature.

First, the prepared solution was sprayed by a 48 kHz ultrasonic atomising nozzle 140 (Sono-Tek Corporation) using the apparatus illustrated in FIG. 1. The created mist 150 was composed of droplets of median diameter of 40 microns and the range of size is 5 to 200 microns. 0.25 mL/min of solution was injected in the nozzle 140 by using a syringe driver. The Sonotek generator 140 was set up to 2 W to generate the mist 150, while at the output of the nozzle 140, a nitrogen flow was used in order to shape the mist 150, and entrain it on the substrate 120. Plasma curing in argon was then performed with a dielectric barrier discharge reactor 107 composed of two flat alumina covered electrodes 160 connected to high voltage 180 and ensuring an efficient plasma surface zone of 18.72 cm². The samples were placed on the moving table 110 (i.e, grounded electrode) ensuring a dynamic deposition mode. The table 110 speed and the gap between the electrodes 160 were fixed at 100 mm·s⁻¹ and 1 mm, respectively. The plasma discharge was ignited with a sinusoidal signal at 10 kHz chopped by a 1667 Hz rectangular signal. The power density was set up to 1.6 W/cm².

A biomolecule in the form of lysozyme (antibacterial peptide) was then immobilised on the coated surface as follows. Substrates coated with the catechol/quinone functionalized layer were immersed in a 10 mM phosphate buffer solution containing lysozyme at 5 mg/ml, at pH 11 during 1h at room temperature under gentle mechanical agitations. The samples were then washed 5 times during 5 minutes with MilliQ purified water.

Scanning Electron Microscopy (SEM) observations were performed on a Hitachi SU-70 FE-SEM after a metallization step.

FT-IR analysis was performed on a Bruker Hyperion 2000 spectrometer equipped a with MCT detector. A grazing angle or ATR objectives were used for the coated stainless steel or aluminium substrates analyses, respectively.

X-ray photon spectroscopy (XPS) was performed with a Kratos Axis-Ultra DLD instrument using a monochromatic Al Kα X-ray source (hu=1486.6 eV) at pass energy of 20 eV. PerkinElmer Lambda 950 UV-vis-NIR (InGaAs) spectrophotometer equipped with an integrating sphere was used for UV-visible spectroscopy.

The antibacterial properties of the deposited layers against Bacillus subtilis, a gram+bacteria, were investigated by using the ISO 22196 antibacterial test. A surface is considered as antibacterial if the logarithmic reduction of the survival bacteria is superior than 2. This test is largely exploited in the industry and derived from the JISZ2801 protocol[27]. A brief description of the method can be found in[28].

The resulting coatings were well adherent to the substrate and powder-free. SEM analysis revealed that the deposits were smooth and covered homogeneously all the surface. This latter result was also confirmed by XPS analysis as no Al and/or Fe was detected.

To obtain a fully covering layer presenting functional groups, the samples are exposed less than 15 seconds under the plasma. This method is in the order of few seconds compared to all other existing methods which are in the order of about an hour. The method of the present invention is thus at least 200 times faster.

The deposition rate, measured with a contact profilometer, was estimated to be around 5 to 10 nm/s,[29]. Hence, catechol/quinone functionalized layers can be deposited according to the present invention with a deposition rate that is at least 200 times faster than the conventional wet chemical methods already reported.

Figure 2:
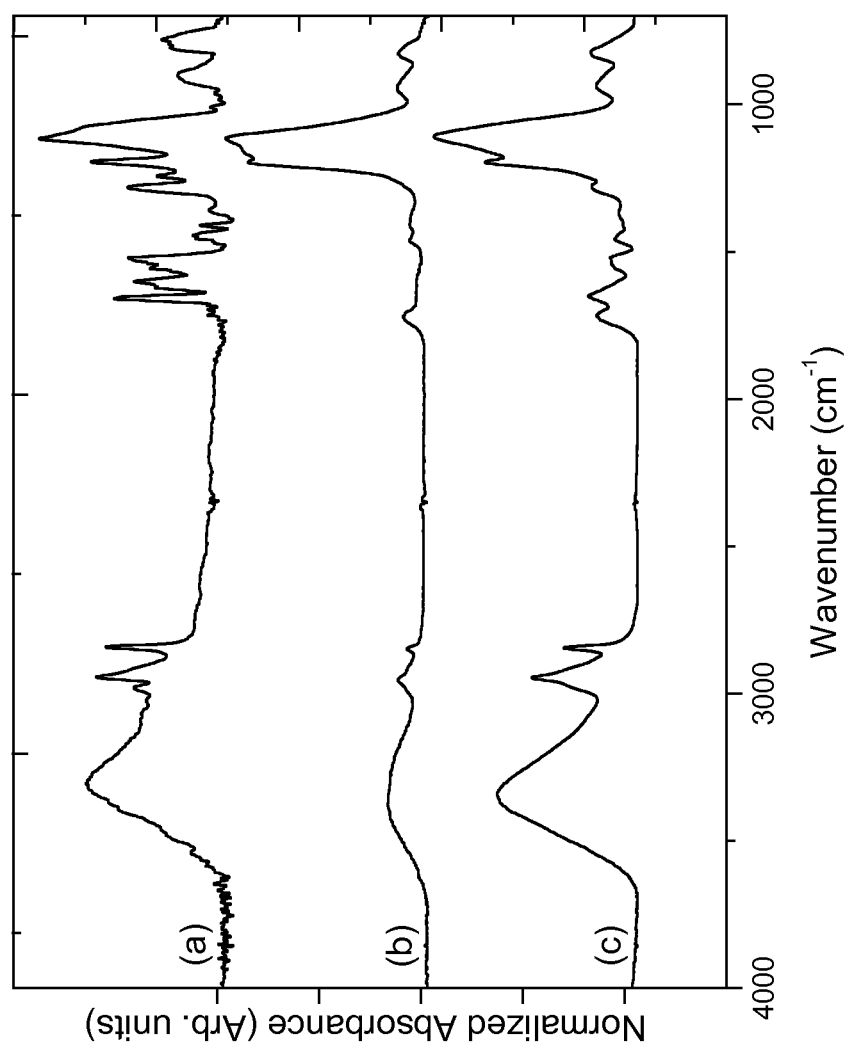
FIG. 2 shows FT-IR spectra of: a sprayed DOA-VTMOS solution (a) and plasma deposited layers from sprayed VTMOS (b) and sprayed DOA-VTMOS solution (c)

According to FT-IR analyses reported in FIG. 2, the plasma deposited layer (spectra c) results clearly from the combination of DOA and VTMOS monomers as several characteristic peaks from dopamine acrylamide and VTMOS are detected. Hence, a broad band at 3345 cm$^{-1}$ can be assigned to OH groups from catechol and NH groups from amide bond in dopamine acrylamide monomer; a very slight shoulder at 3080 cm$^{-1}$ corresponding to =C—H stretching confirms the presence of aromatic compounds. Aromatic out of plane C—H bending vibrations are also visible at 830 cm$^{-1}$. A shoulder at 2920 cm$^{-1}$ is ascribed to stretching of aromatic CH groups. Many peaks are overlapped between 1500 and 1600 cm$^{-1}$. NH bending from amide II presents a peak at 1550 cm$^{-1}$ and aromatic C=C at 1520 cm$^{-1}$. A peak at 1450 cm$^{-1}$ is ascribed to CN stretching. A band at 1740-1720 cm$^{-1}$ might be allocated to C=O from quinones or C=O stretching. The 1650 cm$^{-1}$ peak is ascribed to C=O bending from quinones groups[30] and also could come from the amide bond in the dopamine acrylamide monomer. The absence of the vinylic peak 1600 cm$^{-1}$ from DOA and VTMOS suggests that a plasma polymerisation through the vinyl monomer group occurred. Considering the presence of Si—O stretching, Si—OH, Si—O—CH$_3$ peaks at 1200-1000 cm$^{-1}$, 940 cm$^{-1}$ and 1280 cm$^{-1}$ respectively, it can be concluded that the catechol/quinone functionalized layer might be composed of a silica network resulting from the use of VTMOS. Finally, the peak at 1100 cm$^{-1}$ might be related that an overlap should exist between the Si—O—Si peak and C—C/C—O peak coming from a C—C/C—O network created by the reaction between catechols and radicals as supposed in E. Faure review[31].

Figure 3:
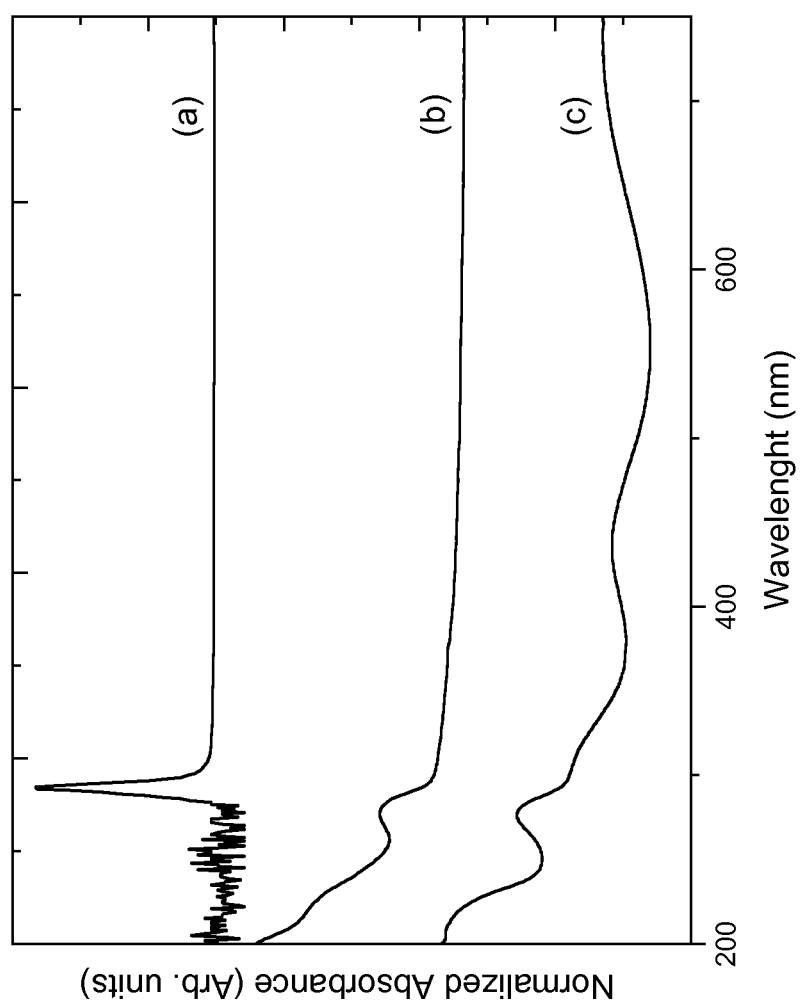
FIG. 3 shows UV-Visible spectra of: 0.5 mg/mL Dopamine acrylamide (DOA) in Vinyltrimethoxysilane (VTMOS) solution (a), sprayed solution "a" on a metallic substrate (b) and plasma deposited layer from sprayed solution "a"(c)

Catechols are chromophore compounds that absorb in the UV zone. Using transmittance UV-Vis analysis, it has been shown that dopamine acrylamide in VTMOS solution shows an absorbance peak at around 290 nm (FIG. 3.a). UV-Visible analyses of plasma deposited layer (FIG. 3.c) confirm the presence of free catechol groups with a small shift of this peak toward 276 nm. The same shift was observed in the UV-analyse of a sprayed DOA/VTMOS solution onto a surface (FIG. 3b). In the plasma deposited layer, one can also notice the formation of a band at 320 nm and the emergence of a peak at 420 nm. The former peak might be due to the formation of a polymer of higher molecular mass, a dopamine derivative intermediate. The peak at 420 nm is sometimes assigned to catechol oxidation and accumulation of phenol coupling products.

By comparing the XPS analyses (Table 1) of plasma deposited layers from pure VTMOS and from a DOA/VTMOS solution in a similar process deposition condition, the successful integration of both comonomers in the layer can be pointed out. Indeed, only DOA/VTMOS plasma deposited layer contains nitrogen element up to 2 at. %.

According to XPS analyses, it can be concluded that lysozyme was successfully immobilized onto the plasma deposited catechol/quinone functionalized layer as an increased amount of nitrogen (from 2 to 13 at. %) and the presence of sulphur, a "fingerprint" of the biomolecule, were detected (Table 1.c).

TABLE 1

XPS atomic percentages for different plasma deposited layers.

| | | Atomic surface composition (at. %) | | | | |
|---|---|---|---|---|---|---|
| | | C | N | O | S | Si |
| a) | Layer from VTMOS | 38 | 0 | 45 | 0 | 17 |
| b) | Layer from DOA/VTMOS | 42 | 2 | 44 | 0 | 12 |
| c) | Layer "b" after lysozyme immobilization | 61 | 13 | 22 | 0.5 | 3 |

JISZ2801 antimicrobial tests were performed on plasma deposited layers after the lysozyme immobilization step. Metallic grafted samples exhibited a total reduction of the bacteria population. Log reduction of the bacteria of 6.9 was achieved, which is far above the 2 log reduction efficacy limit set by the test.

EXAMPLE 3

In this Example, preparation of bio-inspired antibacterial surfaces with the use of a commercial catechol molecule as monomer is described.

The substrate used for deposition is 1 mm thick mirror polished 304 stainless steel disks. Prior to plasma deposition, stainless steel disks were cleaned by successive ultrasonic washings in butanone (5 min.), acetone (1 min.) and absolute ethanol (1min) and further dried under a nitrogen flux. Metallic substrates were then plasma activated through an Ar/O2 plasma treatment (19 slm/1 slm (standard litre per minute)) in continuous (CW) discharge mode at 1.6 W/cm2 during 30 sec.

Catechol molecule (1,2-dihydroxybenzene, Sigma-Aldrich, ≥99%) was dissolved at final concentration of 5 mg/mL in vinyltrimethoxysilane (VTMOS, 98%, Sigma-Aldrich) at ambient temperature.

The plasma deposition method described in Example 2 was used.

In this example, nisin (antibacterial peptide) was used as the biomolecule. The conditions for nisin antibacterial peptide immobilization were as follows. The catechol/quinone plasma functionalized layers were immersed in a 1 mL solution containing 5 mg of nisin and left to react under constant agitation during 1 hour at ambient temperature. Nisin immobilisation was performed in a 10 mM phosphate buffer solution at pH 6.8. The surfaces were then rinsed with deionized water 4 times during 5 minutes under 500 rpm stirring to remove unreacted peptides.

The antibacterial activity of the developed surfaces was investigated by carrying out the ISO2196 antibacterial test.

Surfaces achieved by the plasma deposition of a functionalized catechol/quinone layer according to the present invention and further reacted with antibacterial nisine presented a logarithmic reduction of the survival bacteria up to 5.

EXAMPLE 4

In this example, preparation of bio-inspired antibiofilm surfaces is described. The materials were the same as for Example 2 except that the biomolecule used is DispersinB (antibiofilm), which has been produced according to the protocol published by Kaplan et al. (Kaplan, J. B. Ragunath, C. Ramasubbu N. Fine D. H, J. Bacteriol. 2005, 185, 4693). The plasma deposition method was the same as for Example 2.

The DispersinB (Antibio-film enzyme) immobilization conditions were as follows. Substrates coated with the catechol/quinone functionalized layer were immersed in a 10 mM phosphate buffer solution containing Dispersin B at 1 mg/ml, at pH 7 during 1 h at room temperature under gentle mechanical agitations. The samples were then washed 5 times during 5 minutes with MilliQ purified water.

Complementary data for the preparation of the Dispersin B (DspB) are as follows. pET-28a/DspB-expressing Escherichia coli was grown overnight at 37° C. with shaking in 50 ml LB medium supplemented with 50 µg/ml kanamycin. The bacterial suspension was diluted 100-fold in a total of 2 liters of LB supplemented with kanamycin (50 μg/ml), and the expression of DspB was induced with isopropyl-β-D-thiogalactopyranoside (final concentration, 0.5 mM) when the culture reached an A600 of 0.6. The induced culture was incubated for further 4 h at 37° C. with shaking. DspB was purified by nickel affinity chromatography as previously described [Faure et al., Adv. Funct. Mater. 2012, 22, 5271-5282]. Fractions were analyzed by SDS-PAGE and by the ability to hydrolyze the chromogenic substrate 4-nitrophenyl-N-acetyl-β-D-galactosaminide (Sigma Aldrich). Those fractions containing Dispersin B were pooled and dialyzed against 10 mM PO4 pH 5.9, 100 mM NaCl overnight at 4° C. Proteins were quantified using the BCA kit (Pierce).

An in-vitro anti-adhesion test was performed as follows. A preculture of biofilm forming *S. epidermidis* ATCC35984 was grown overnight at 37° C. in LB (3 mL) and used the next morning to seed a fresh culture in LB (50 mL). The bacterial concentration of test inoculum was adjusted to about 10^7 cells mL$^{-1}$ in M63 medium supplemented with glucose and casamino acids. Metallic substrates coated with anti-adhesive films were placed in Petri dishes containing damp blotting paper. Test inoculum (200 μL) was pipetted onto each substrate. The Petri dishes containing the inoculated coupons were closed and incubated at 37° C. for 24 h. The treated substrates were rinsed twice with sterile deionized water (10 mL) to remove non-adherent bacteria and then placed face downward in glass jars containing 500-fold-diluted LB (20 mL) and 4-mm glass beads. The jars were shaken horizontally for 10 minutes and then their contents were sonicated in a water bath (50-60 kHz) for 2 minutes. Viable bacteria were counted by plating 10-fold dilution on LB agar. The plates were incubated at 37° C. overnight at room temperature before colony-forming units were counted.

An assessment of the bioactivity was carried out as follows. As reported in Table 2, summarizing the bioactivity results achieved with surfaces elaborated according to the present invention, it can be concluded that surfaces are elaborated through a reproducible way and present strong anti-biofouling properties with a reduction in population up to 97%.

TABLE 2

Antiadhesion bioactivity estimated for plasma as-deposited layer and plasma deposited layer after DispersinB immobilization.

| Samples | Adherent population, % | Population reduction, % |
|---|---|---|
| Stainless-steel | 2 · 10^6 (100%) | |
| Plasma deposited layer after DspB immobilization | 6 | 94 |
| | 14 | 86 |
| | 9 | 91 |

EXAMPLE 5

In this example, the preparation of bio-inspired surfaces for water depollution, hereafter for antibiotic degradation is described.

Metallic and organic synthetic substrates were used, namely, 1 mm thick mirror polished 304 stainless steel disks and nylon membranes. In this example, a becta-lactamase, an enzyme able to degrade antibiotics, was also used as the biomolecule. For the plasma deposition method, see Example 1.

The biomolecule immobilization conditions were as follows. A beta-lactamase biomolecule, was immobilized onto a plasma deposited catechol/quinone functionalized layer by using a 1 mg/ml biomolecule concentration in a 100 mM phosphate buffered solution, at pH=7.5.

Enzymatic activity was estimated through the amoxicillin degradation monitoring over time. Enzymes were incubated in a 2 mL degradation medium composed of tap water filtered through 0.22 μm, HEPES (12.5 mM), BSA (10 μg·mL$^{-1}$) and amoxicillin (100 μg·mL$^{-1}$). Each 24 h, the degraded amoxicillin concentration was estimated by absorbance measurements at 210 nm with a 2 Synergy microplate reader (Biotek). The medium was removed every 24 hours, wells were washed 3 times with filtered tap water and a new volume of the degradation medium was put in wells.

Enzymatic activity assays for free enzymes in solution. In the wells used for the first measurements (T=24 h), enzymes were directly dissolved in a volume of 2 mL of the degradation medium containing 100 μg·mL$^{-1}$ of amoxicillin. For all other wells, at time T0, enzymes were dissolved in a 300 μL solution containing 20 μg·mL$^{-1}$ of amoxicillin. All wells were fed by this same volume every 24 hours. 24 hours prior absorbance measurement, wells were amended with 100 μg·mL$^{-1}$ of antibiotic and supplemented to achieve a final volume of 2 ml.

Figure 4:
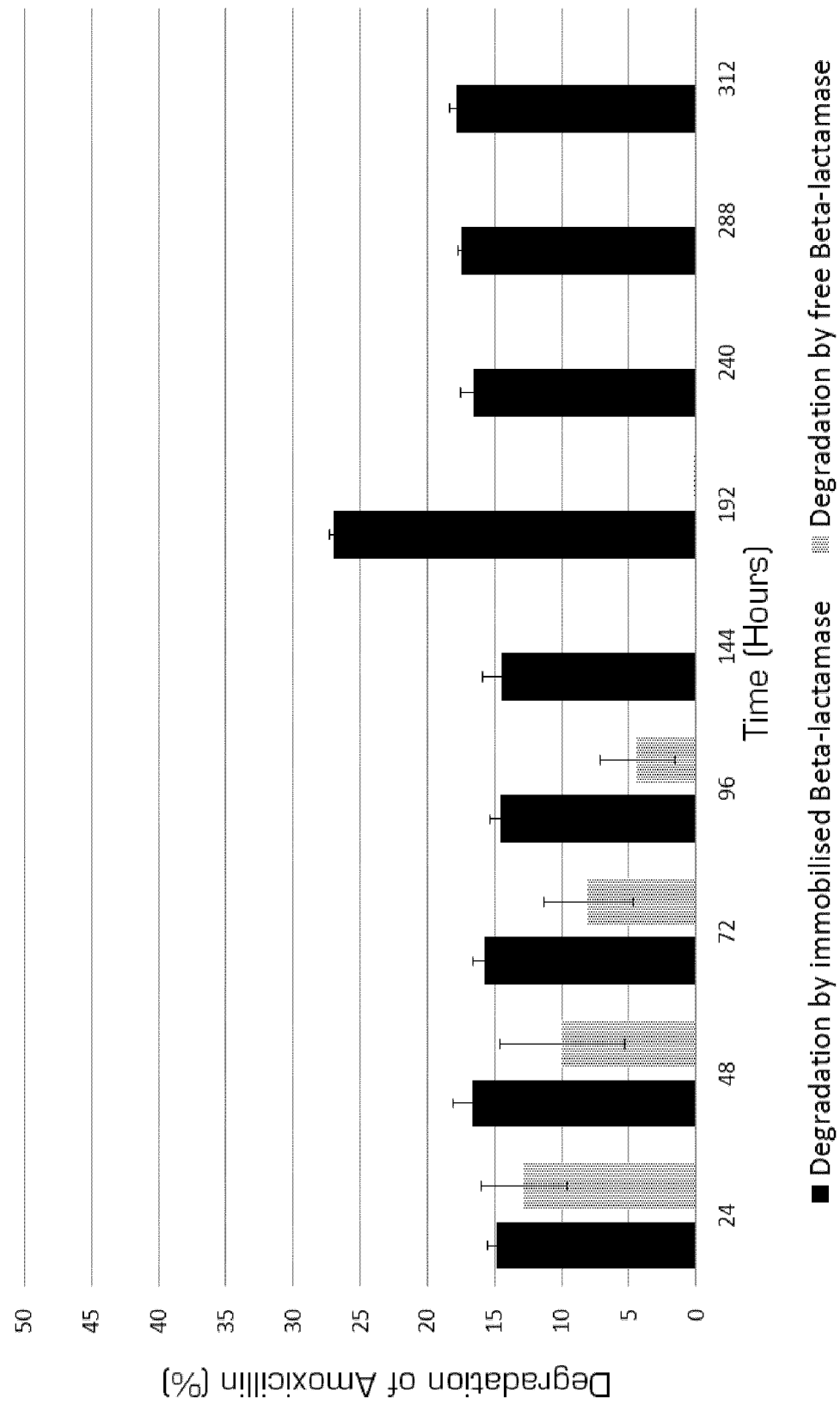
FIG. 4 shows a degradation assay of amoxicillin by free and immobilized beta-lactamase.

The bioactivity is assessed in the results shown in FIG. 4 which is a bar chart showing degradation of amoxicillin for free and immobilized beta-lactamase. On the y-axis, the percentage degradation of amoxicillin is shown. On the x-axis, the time in hours is measured. At the time periods of 24, 48, 72 and 96 hours, the percentage degradation of amoxicillin is shown for immobilized beta-lactamase (left hand bars) and free beta-lactamase (right hand bars). At 144, 192, 240, 288 and 312 hours, only the percentage degradation of amoxicillin is shown for immobilized beta-lactamase.

As reported in FIG. 4, one can clearly observe that immobilized enzymes allow reaching high degrading antibiotics rates during 13 days. Over 24 h, it can also be noticed that the biological performance of immobilized enzymes is clearly superior to the free enzyme one.

The resistance to erosion of the functionalized disks elaborated according to the present invention was investigated by placing the substrates in a Biofilm Reactor Annular LJ 1320 (Biosurface Technologies Corporation). The coated substrates were subjected to 30 km·h$^{-1}$ water flows. After 48 h and 6 days, the enzymatic activity was investigated. Interestingly, the activity of immobilized enzymes after this erosion test was not altered reflecting a strong enzymes anchoring onto the functionalized surface.

EXAMPLE 6

In this example, preparation of bio-inspired antibiofilm surfaces is described based on the plasma deposition of a pre-formed polymer carrying quinone groups.

The substrates used for deposition were 1 mm thick mirror polished 304 stainless steel disks or aluminium foils. Stainless steel disks were first cleaned by successive ultrasonic washings in butanone (5 min.), acetone (1 min.) and absolute ethanol (1 min) and further dried under a nitrogen flux. Before plasma deposition, the metallic substrates were plasma cleaned and activated through an Ar/O$_2$ plasma treatment (19 slm/1 slm (standard litre per minute)) in continuous (CW) discharge mode at 1.6 W/cm2 during 30 sec.

A homopolymer of methacrylamide bearing 3,4-dihydroxy-L-phenylalanine, noted P(mDOPA) (molecule (1)), was prepared and oxidized in basic media according to a procedure described in J. Mater. Chem. 2011, 21, 7901-

7904. For that, 20 mg of P(mDOPA) was dispersed in a 10 mL distilled water solution and a NaOH solution (0.1 M) was slowly added in order to raise the pH above 10. The oxidation step lasted at least one night under air. At the end of the reaction, polymer solution presents a pink colour characteristics confirming that the oxidized Pox(mDOPA) polymer had been obtained, (molecule (2)).

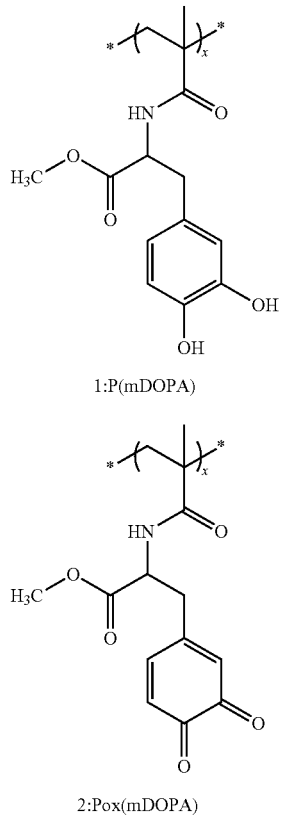

1:P(mDOPA)

2:Pox(mDOPA)

The plasma deposition method and conditions used were as described in Example 2. Here, a 0.5 mL/min of a Pox(mDOPA) solution was injected in the nozzle by using a syringe driver.

The antibiofilm biomolecule used was DispersinB (DspB). The production and immobilization conditions of DspB are already reported in Example 4.

An assessment of the bioactivity was carried out as follows. As reported in Table 3, summarizing the bioactivity results achieved with surfaces elaborated according to the present invention, it can be concluded that surfaces presented strong anti-biofouling properties with an average reduction in population up to 85%.

TABLE 3

Anti-adhesion bioactivity estimated for stainless-steel substrates and plasma deposited layers from pre-formed polymer containing quinone groups and after DispersinB immobilization.

| Samples | Adherent population, % | Reduction in population, % |
|---|---|---|
| Stainless-steel | 2 × 10⁶ (100%) | |
| Plasma deposited layer after DspB immobilization | 10.3 | 89.7 |
| | 19.4 | 80.6 |
| | 16.8 | 83.2 |

The invention claimed is:

1. A method for adhering a catechol and quinone functionalized layer to a substrate wherein the method comprises the steps of:
   a) providing a substrate;
   b) providing a precursor comprising at least one monomer and a molecule with an unprotected catechol group;
   c) applying a plasma procedure to said precursor and said substrate in order to form a coating comprising a catechol and quinone functionalized layer on said substrate,
   wherein said molecule with an unprotected catechol group is at least one of

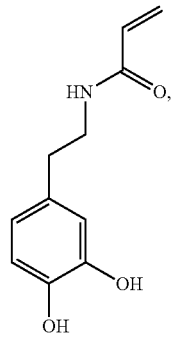

and

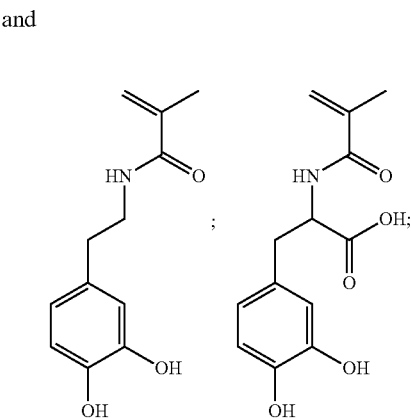

-continued

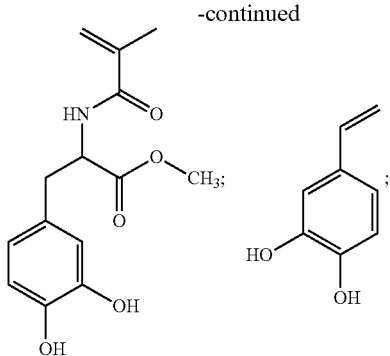

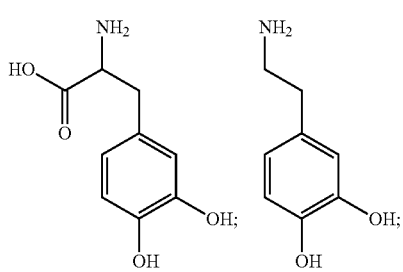

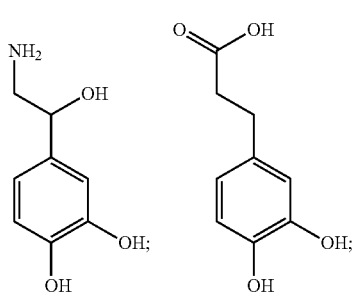

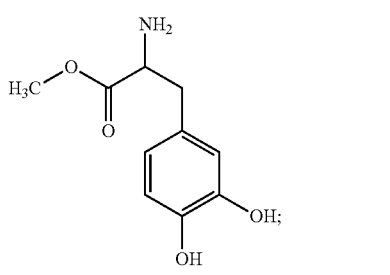

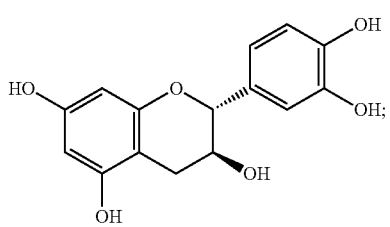

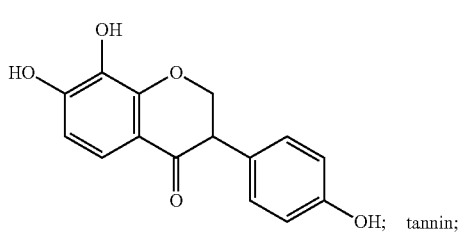 tannin;

-continued

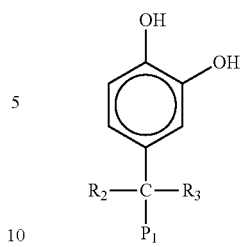

wherein $R_2$ and $R_3$ are the same or different, and independently represent a hydrogen atom, a saturated $C_{1-4}$ hydrocarbon group, and wherein $P_1$ represents separately and independently —NH$_2$, —COOH, —OH, —SH,

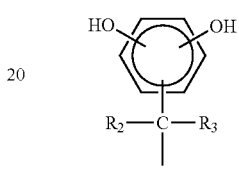

wherein $R_2$ and $R_3$ are the same or different, and independently represent a hydrogen atom, a saturated $C_{1-4}$ hydrocarbon group, an halogen,

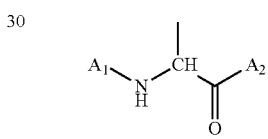

wherein each of $A_1$ and $A_2$ independently represents a hydrogen atom; or

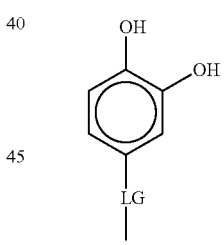

wherein LG represents a linking group and is chosen from oligomers having chemical structure —[C($R_2$)($R_3$)]$_x$—$P_2$ wherein $R_2$ and $R_3$ are the same or different, and independently represent a hydrogen atom, a saturated $C_{1-4}$ hydrocarbon group and wherein $P_2$ represents —NH$_2$, —COOH, —OH, —SH, an halogen, —NH-$A_5$-, —C(O)$A_6$, —CH(NH$A_5$)-c(O)-$A_6$ wherein $A_5$ represents —H, —C and $A_6$ represents —OH, —NH$_2$.

2. The method according to claim 1, wherein said monomer is vinyltrimethoxysilane.

3. The method according to claim 1, wherein a step of cleaning the substrate by ultrasonic washing is carried out before step (a).

4. The method according to claim 1, wherein a polymerisation initiator agent is injected into the precursor one of before step (c) or during step (c).

5. The method according to claim 4, wherein said polymerization initiator agent is a free radical initiator.

6. The method according to claim 5, wherein said free radical initiator is one of 4,4'-azobis(4-cyanopentano acid), 2,2'-azobis[2-methyl-N-(1,1-bis-(hydroxymethyl)-hydroxyethylpropionamide],2,2'-azobis(2-methylpropionamidine) dihydrochloride, 2,2'-azobis[2-methyl-N-(2-hydroxyethyl) propionamide], 2,2'-azobis(isobutyramidine hydrochloride), 2,2'-azobis[2-methyl-N-(1,1-bis(hydroxymethyl)-2-ethyl)-propionamide], 2,2'-azobis[2-(2-imidazolin-2-yl)propane] dihydrochloride, 2,2'-Azobis[N-(2-carboxyethyl)-2-methyl-propionamidine] hydrate, 2,2'-Azobis{2-[1-(2-hydroxyethyl)-2-imidazolin-2-yl]propane}dihydrochloride, 2,2'-Azobis(1-imino-1-pyrrolidino-2 ethylpropane)dihydro chloride, 2,2'-Azobis{2-methyl-N-[1,1-bis(hydroxymethyl)-2-hydroxyethyl]propionamide},2,2'-azobis[2-methyl-N-(2-hydroxyethylpropionamide], 2,2'-azobis(isobutylamide) dihydrate, or azoinitiators having polyethylene glycol unit.

7. The method according to claim 1, wherein the plasma used in step (c) is a non-equilibrium plasma process operating at atmospheric pressure.

8. The method according to claim 1, wherein said plasma of step (c) is generated by an electrical excitation, said electrical excitation comprising an electrical signal which is delivered in a pulsed wave form.

9. The method according to claim 1, wherein said monomer is at least one of an acrylate derivative, a methacrylate derivative, a styrene derivative, a vinyl ester derivative, a vinyl amide derivative, acrylonitrile, methacrylonitrile, acrylamide, methacrylamide, an unsaturated vegetable oil, a fatty acid, an acryclic acid, a methacrylic acid, a vinyl alkoxysilanes, ethylene, hexamethyldisiloxane, hexamethyldisilazane, octamethylcyclotetrasiloxane, decamethylcylcopentasiloxane, dodecamethylcyclohexasiloxane, hexaethyldisiloxane, tetraethylorthosilicate, tetramethyldisiloxane, pentamethylcyclopentasiloxane, octamethylcyclooctasiloxane, polydimethylsiloxane and derivatives of polydimethylsiloxane.

* * * * *